United States Patent
Kim et al.

(10) Patent No.: US 11,061,508 B2
(45) Date of Patent: Jul. 13, 2021

(54) TOUCH SENSOR AND METHOD OF DRIVING THE SAME

(71) Applicant: Samsung Display Co., Ltd., Yongin-Si (KR)

(72) Inventors: Do Ik Kim, Yongin-si (KR); Sang Hyun Lim, Yongin-si (KR); Ga Young Kim, Yongin-si (KR); Young Sik Kim, Yongin-si (KR); Sang Chul Lee, Yongin-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 17/026,333

(22) Filed: Sep. 21, 2020

(65) Prior Publication Data

US 2021/0004120 A1 Jan. 7, 2021

Related U.S. Application Data

(63) Continuation of application No. 16/446,717, filed on Jun. 20, 2019, now Pat. No. 10,782,826, which is a continuation of application No. 15/914,281, filed on Mar. 7, 2018, now Pat. No. 10,338,747.

(30) Foreign Application Priority Data

May 2, 2017 (KR) .................. 10-2017-0056500

(51) Int. Cl.
*G06F 3/041* (2006.01)
*G06F 3/044* (2006.01)

(52) U.S. Cl.
CPC .......... *G06F 3/04182* (2019.05); *G06F 3/044* (2013.01); *G06F 3/0418* (2013.01); *G06F 3/0443* (2019.05); *G06F 3/0446* (2019.05); *G06F 3/04164* (2019.05); *G06F 2203/04111* (2013.01)

(58) Field of Classification Search
CPC .............................................. G06F 3/041–047
See application file for complete search history.

(56) References Cited

U.S. PATENT DOCUMENTS

| 9,244,573 | B2 | 1/2016 | Ryu et al. |
| 10,551,949 | B2 | 2/2020 | Chai et al. |
| 2012/0218482 | A1 | 8/2012 | Hwang et al. |
| 2012/0256868 | A1 | 10/2012 | Choi et al. |

(Continued)

FOREIGN PATENT DOCUMENTS

| KR | 10-2012-0115766 A | 10/2012 |
| KR | 10-1620463 B1 | 5/2016 |

(Continued)

*Primary Examiner* — Roy P Rabindranath
(74) *Attorney, Agent, or Firm* — Innovation Counsel LLP

(57) ABSTRACT

In an embodiment, a touch sensor may include a sensor part including a first electrode and a second electrode, a signal receiving part, an amplifier circuit part connected between the second electrode and the signal receiving part, an analog-to-digital converter part configured to output a digital signal corresponding to a voltage difference between input terminals, and a processor configured to detect a touch input from the sensor part in response to the digital signal when operating in a first mode, and to output a gain control signal for calibrating a gain value of the amplifier circuit part in response to the digital signal when operating in a second mode.

22 Claims, 21 Drawing Sheets

(56) References Cited

U.S. PATENT DOCUMENTS

| | | |
|---|---|---|
| 2013/0257785 A1 | 10/2013 | Brown et al. |
| 2013/0279769 A1 | 10/2013 | Benkley, III et al. |
| 2015/0234498 A1 | 8/2015 | Cho et al. |
| 2016/0018348 A1* | 1/2016 | Yau .................. G06F 3/0443 |
| | | 324/697 |
| 2016/0147368 A1 | 5/2016 | Kim et al. |
| 2018/0157355 A1 | 6/2018 | Kim |
| 2018/0224984 A1 | 8/2018 | Kim et al. |
| 2018/0329555 A1 | 11/2018 | Kim et al. |
| 2018/0329576 A1 | 11/2018 | Kim et al. |
| 2018/0348912 A1* | 12/2018 | Lee .................... G06F 3/04166 |

FOREIGN PATENT DOCUMENTS

| | | |
|---|---|---|
| KR | 10-2018-0064625 A | 6/2018 |
| KR | 10-2018-0090936 A | 8/2018 |
| KR | 10-2018-0125671 A | 11/2018 |
| KR | 10-2018-0125672 A | 11/2018 |

\* cited by examiner

TOUCH SENSOR AND METHOD OF DRIVING THE SAME

CROSS-REFERENCE TO RELATED APPLICATIONS

This application is a continuation application of U.S. patent application Ser. No. 16/446,717 filed on Jun. 20, 2019, which is a continuation application of U.S. patent application Ser. No. 15/914,281 filed on Mar. 7, 2018, which claims priority under 35 USC § 119 to Korean patent application number 10-2017-0056500, filed on May 2, 2017, the entire disclosures of which are incorporated herein in its entirety by reference.

BACKGROUND

Field

Various exemplary embodiments of the present inventive concept relate to a touch sensor and a method of driving the same.

Description of Related Art

Touch sensor is a type of information input device. It may be used on a display device. For example, it may be attached to one surface of a display panel implementing image display function or may be implemented in the display panel. A user may input information by pressing or touching the touch sensor while viewing the images being shown on the display panel.

SUMMARY

Embodiments provide a highly sensitive touch sensor and a method of driving the same.

In an embodiment, a touch sensor may include a sensor part including a first electrode and a second electrode spaced apart from each other, a signal receiving part including a first terminal connected to the first electrode and a second terminal connected to the second electrode, an amplifier circuit part connected between the second electrode and the second terminal, an analog-to-digital converter part including a third terminal connected to another terminal of the signal receiving part and a fourth terminal connected to the second terminal and configured to output a digital signal corresponding to a voltage difference between the third and fourth terminals, and a processor configured to detect a touch input from the sensor part in response to the digital signal when operating in a first mode, and to output a gain control signal for calibrating a gain value of the amplifier circuit part in response to the digital signal when operating in a second mode.

In an embodiment, the signal receiving part may include a first amplifier including the first and second terminals, a first switch turned on during the first mode and a second switch turned on during the second mode, the first and second switches being connected in parallel between another terminal of the first amplifier and the first terminal, a first capacitor and a reset switch connected in parallel between the first switch and the another terminal of the first amplifier, and a second capacitor and a first resistor connected in parallel between the second switch and the another terminal of the first amplifier.

In an embodiment, the amplifier circuit part may include a second amplifier including a fifth terminal connected to the second electrode and a sixth terminal connected to a bias power source and a variable resistor connected between another terminal of the second amplifier and the bias power source and having a resistance value changing in response to the gain control signal.

In an embodiment, the second terminal is connected to the variable resistor.

In an embodiment, the touch sensor may further include a peak hold circuit connected between the another terminal of the signal receiving part and the peak hold circuit.

In an embodiment, the touch sensor may further include at least one switch connected between the peak hold circuit and the third terminal and at least one switch connected between the another terminal of the signal receiving part and the peak hold circuit.

In an embodiment, the peak hold circuit may include a third amplifier including seventh and eighth terminals, the seventh terminal being connected to the another terminal of the signal receiving part, at least one buffer connected between another terminal of the third amplifier and the third terminal, a first diode connected between the another terminal of the third amplifier and the buffer, a second diode connected between the another terminal of the third amplifier and the eighth terminal in the same direction as the first diode, and a third capacitor and a fourth switch connected in parallel between a connection node between the first diode and the buffer and the second terminal.

In an embodiment, the touch sensor may include at least one switch connected between the another terminal of the signal receiving part and the peak hold circuit.

In an embodiment, the analog-to-digital converter part may include a differential analog-to-digital converter including the third and fourth terminals.

In an embodiment, the analog-to-digital converter part may include a fourth amplifier including the third and fourth terminals and an analog-to-digital converter connected to another terminal of the fourth amplifier.

In an embodiment, the sensor part may include a plurality of first electrodes including the first electrode and a plurality of second electrodes including the second electrode.

In an embodiment, the first and second electrodes may extend in a first direction in an active area provided in the sensor part, and each of the second electrodes may include an electrode part surrounded by respective one of the first electrodes.

In an embodiment, each of the first electrodes may include a plurality of electrode cells arranged in the first direction and include at least one opening disposed inside of each of the plurality of electrode cells and a plurality of first connecting parts may connect the first electrode cells in the first direction.

In an embodiment, each of the second electrodes may include a plurality of electrode parts disposed inside of each opening of the first electrode cells and a plurality of connection lines connecting the electrode parts in the first direction.

In an embodiment, the touch sensor may include a plurality of signal receiving parts including the signal receiving part, each of the first electrodes being connected to a different one of the signal receiving parts.

In an embodiment, each of the second electrodes may be commonly connected to the fifth terminal included in the amplifier circuit part, and a second terminal of the signal receiving part corresponding to each of the first electrodes may be connected to a different variable resistor among a plurality of variable resistors provided in the amplifier circuit part.

In an embodiment, the touch sensor may further include a plurality of third electrodes spaced apart from the first and second electrodes in the active area and extending in a second direction and a driving circuit supplying driving signals to the third electrodes.

In an embodiment, a method of driving a touch sensor including a sensor part is provided. The touch sensor includes a first electrode and a second electrode extending in a first direction and spaced apart from each other, and a signal receiving part including a first terminal and a second terminal connected to the first and second electrodes, respectively. The method includes detecting touch input in response to a voltage difference between a sensing signal input to the first terminal and a noise signal input to the second terminal when operating in a first mode and calibrating a gain value of a second noise signal in response to a voltage difference between a first noise signal and the second noise signal input to the first and second terminals, respectively, when operating in a second mode.

In an embodiment, the sensor part may further include a third electrode extending in a second direction and spaced apart from the first and second electrodes, and the method further including supplying a driving signal to the third electrode when operating in the first mode.

In an embodiment, the touch sensor may further include a variable resistor connected between the second electrode and the second terminal, the method further including generating a gain control signal for calibrating a resistance value of the variable resistor such that a voltage difference between the first and second noise signals is reduced when operating in the second mode.

In an embodiment, a touch sensor may include a sensor part including a first electrode extending in a first direction, a second electrode extending in the first direction and electrically disconnected to the first electrode, the second electrode including a plurality of electrode parts and a plurality of connection line connecting adjacent electrode parts, and a third electrode extending in a second direction substantially perpendicular to the first direction and electrically disconnected to the first electrode and the second electrode.

In an embodiment, the plurality of electrode parts may be disposed in openings formed in the first electrode.

In an embodiment, the touch sensor may further include a plurality of fourth electrodes disposed in the openings to overlap the plurality of electrode parts, respectively.

In an embodiment, one of the plurality of fourth electrodes and one of the plurality of electrode parts disposed in a same opening may be connected through a contact hole formed in an insulating layer disposed between the plurality of fourth electrodes and the plurality of electrode parts.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

Figure 1:
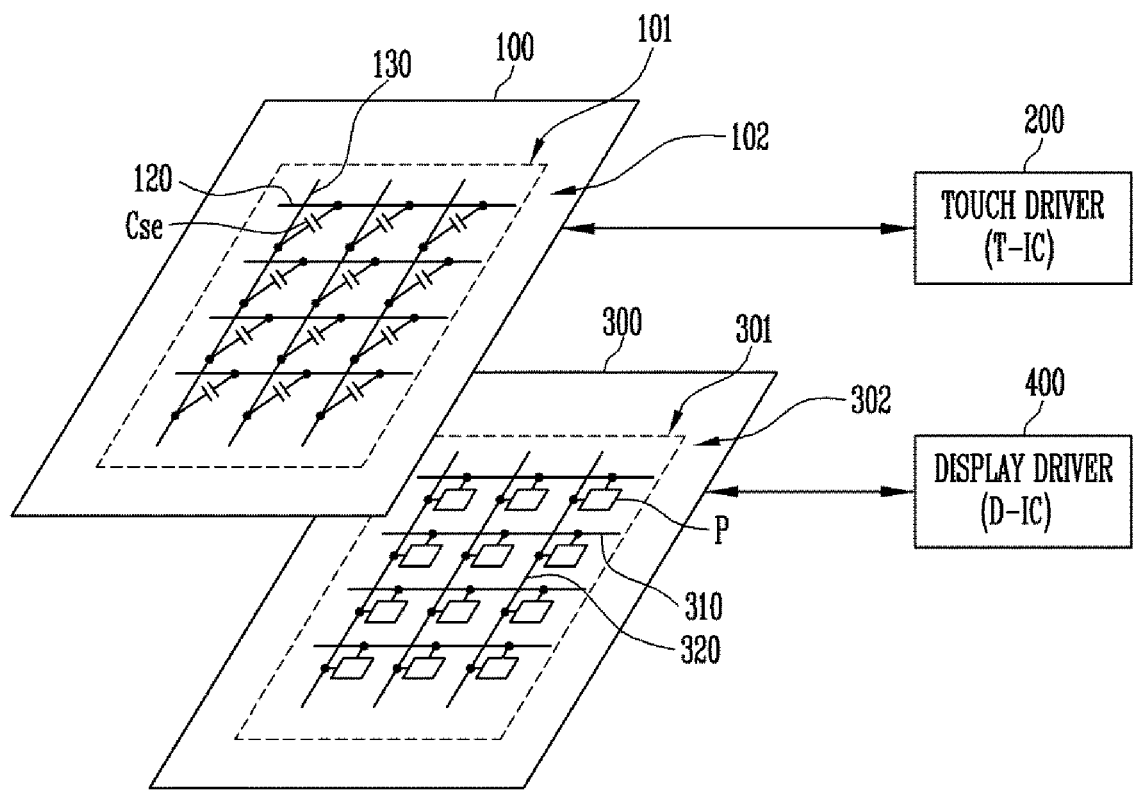

The above and other features and advantages of the present inventive concept will become more apparent to those of ordinary skill in the art by describing in detail exemplary embodiments with reference to the attached drawings in which:

FIG. 1 is a schematic view showing a display device according to an embodiment.

Figure 2:
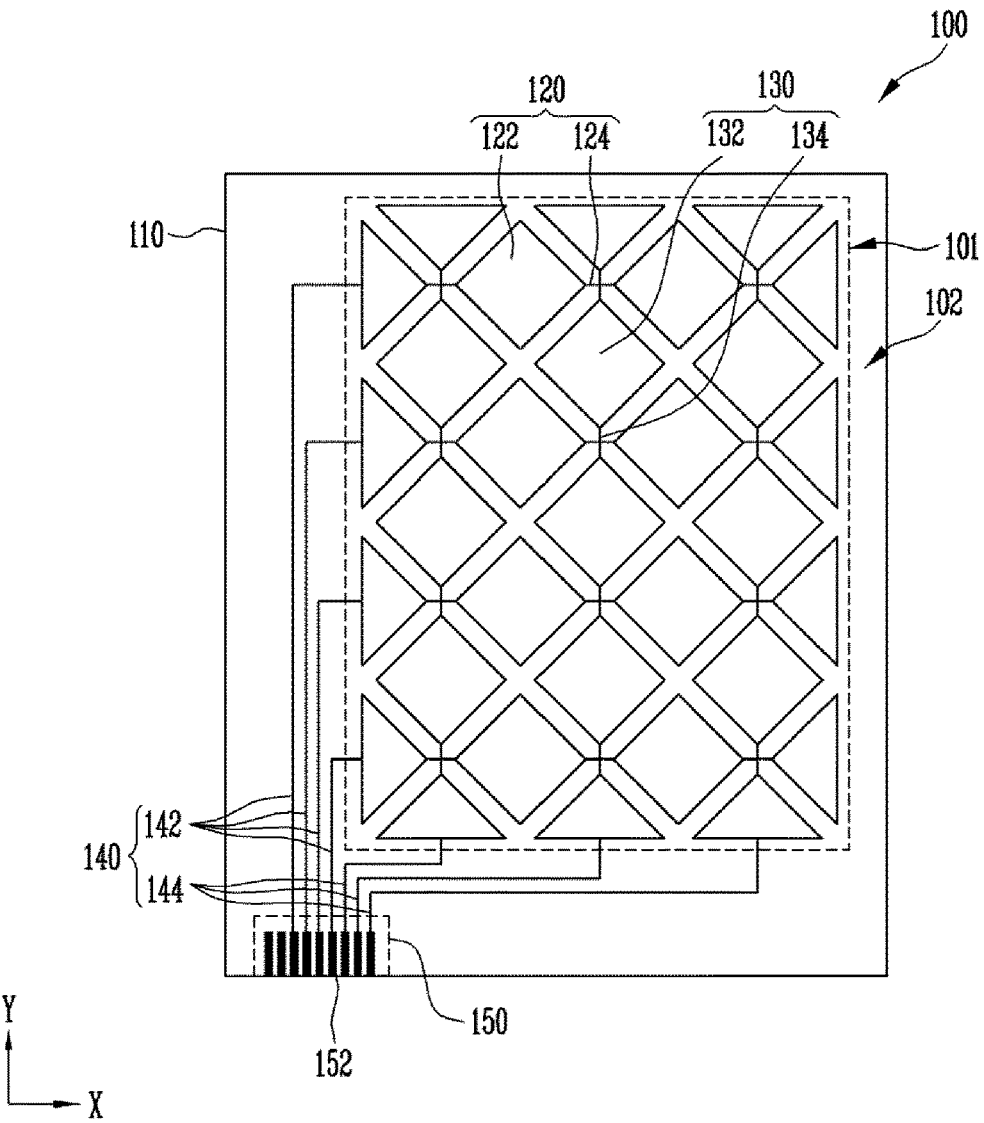

FIG. 2 shows a sensor part of a touch sensor according to an embodiment.

Figure 3:
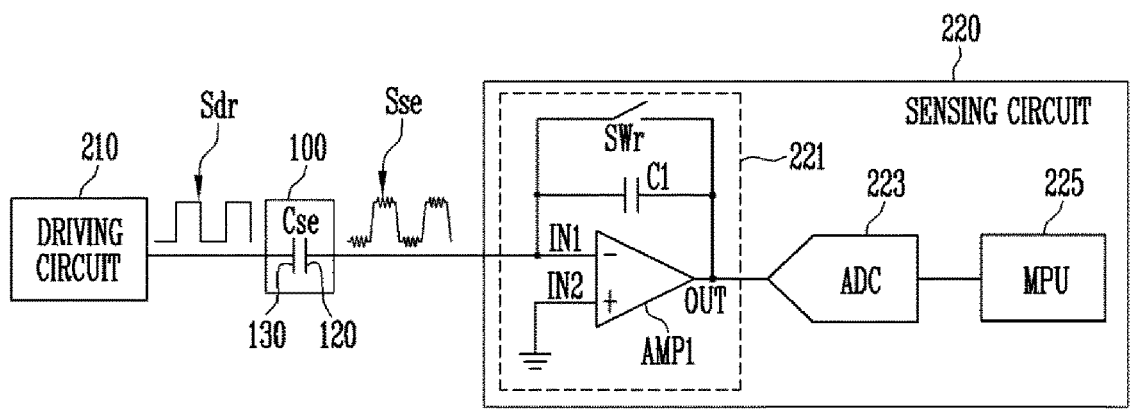

FIG. 3 shows a touch sensor according to an embodiment.

Figure 4:
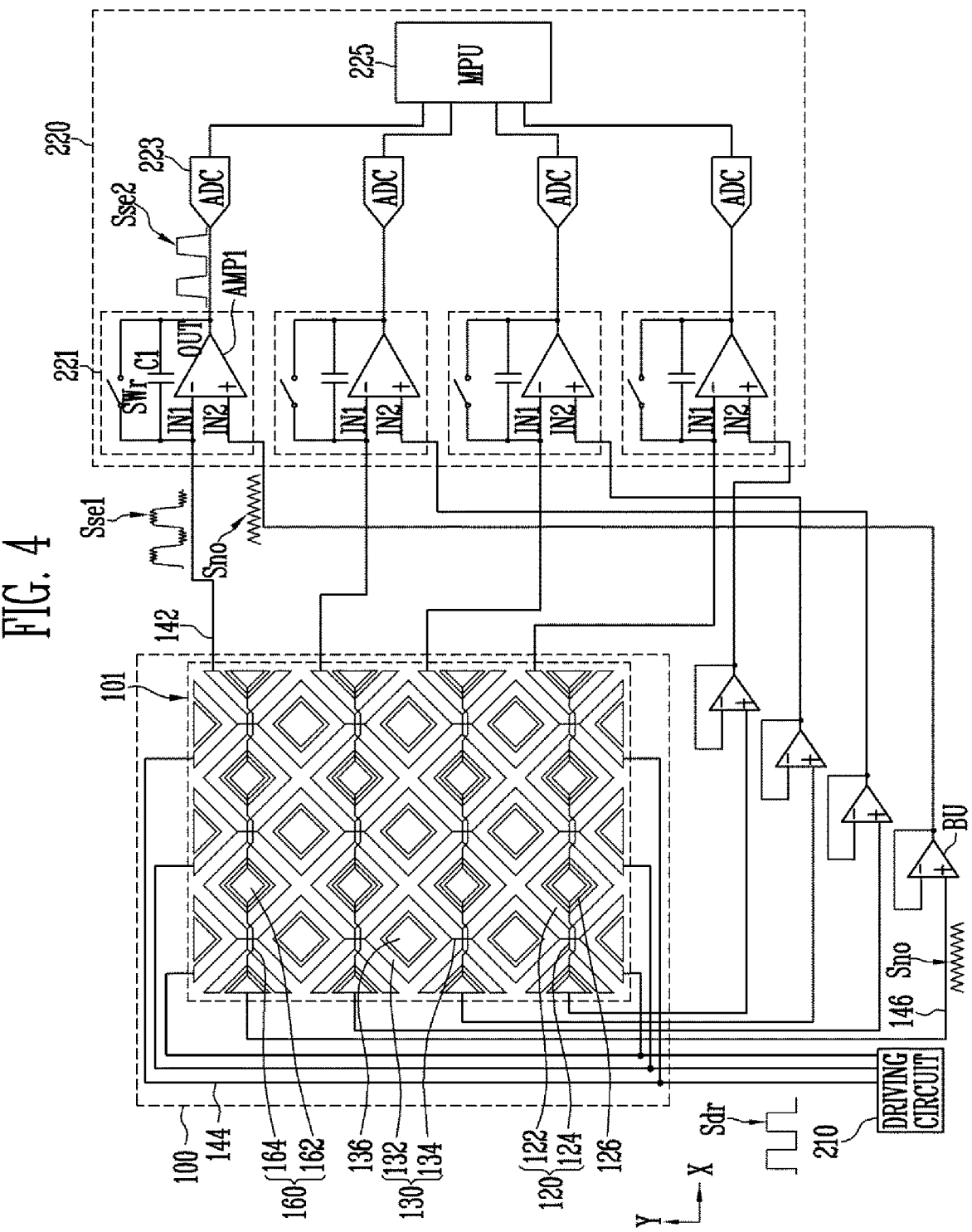

FIG. 4 shows a touch sensor according to an embodiment.

Figure 5:
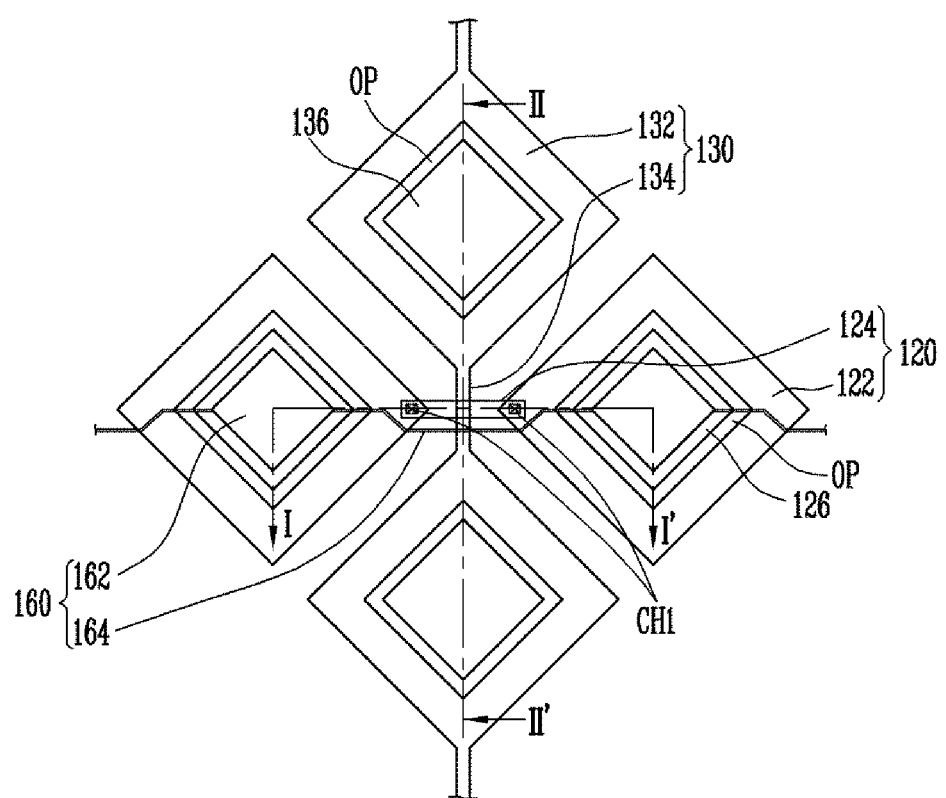

FIG. 5 shows an embodiment relating to the sensor part shown in FIG. 4.

Figure 6A:
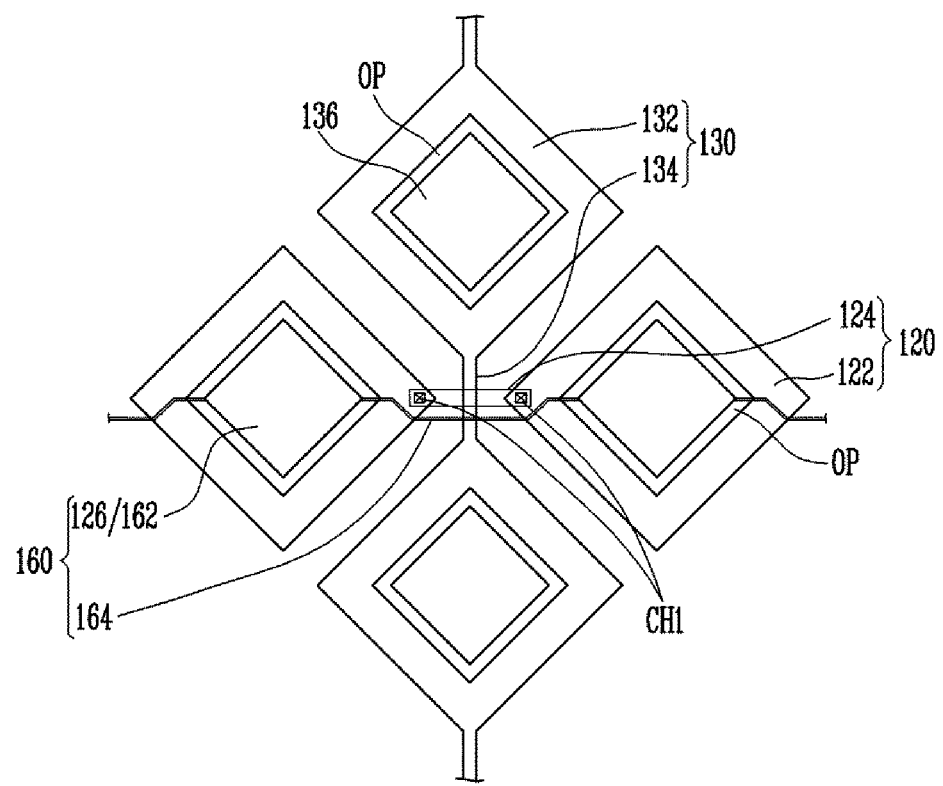
Figure 6B:
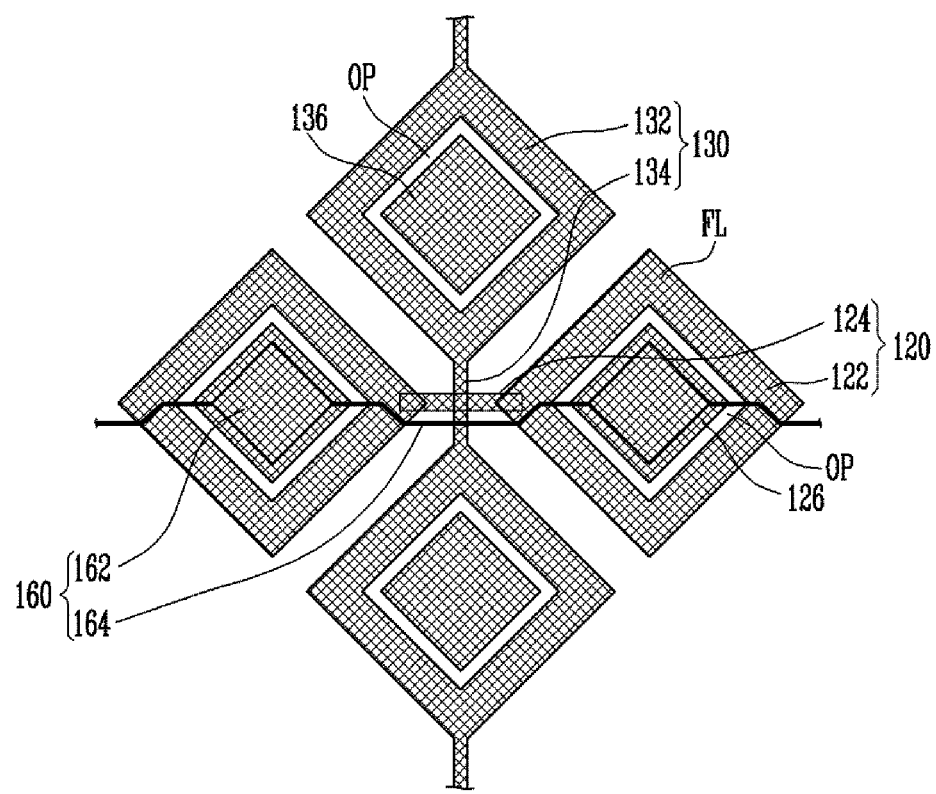

FIGS. 6A and 6B show different embodiments of the sensor part shown in FIG. 5.

Figure 7A:
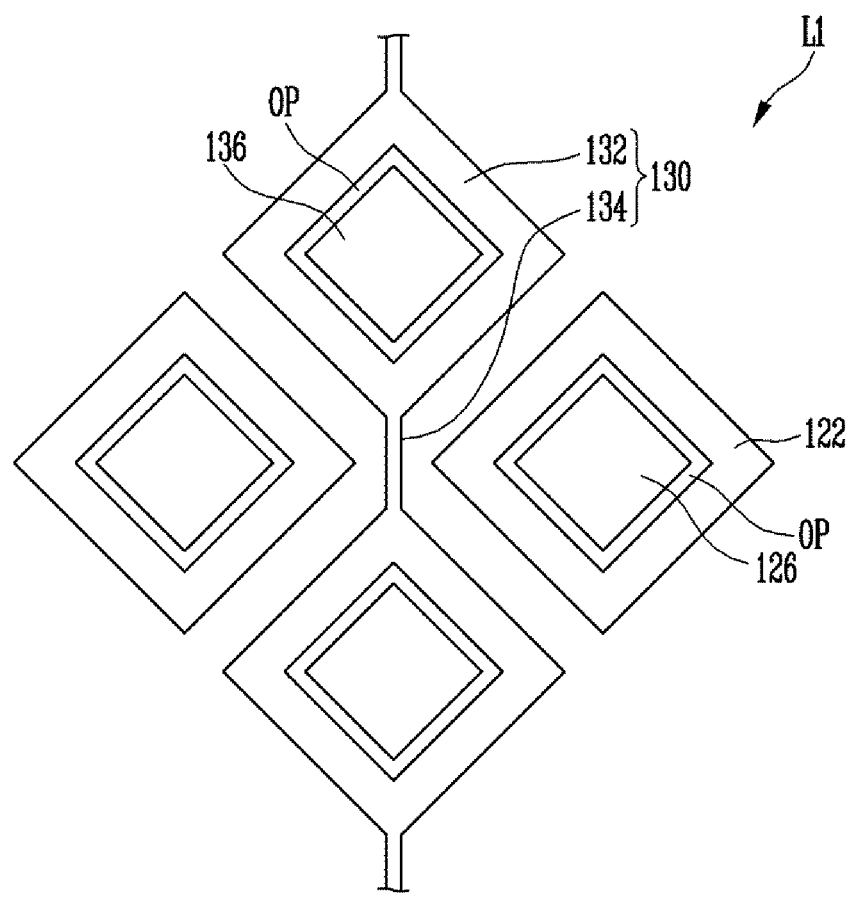

FIG. 7A show a first layer of the sensor part shown in FIG. 5.

Figure 7B:
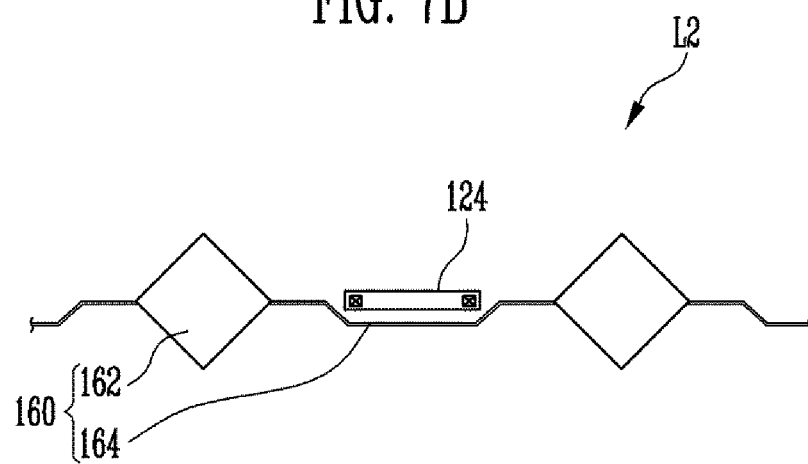

FIG. 7B shows a second layer of the sensor part shown in FIG. 5.

Figure 8A:
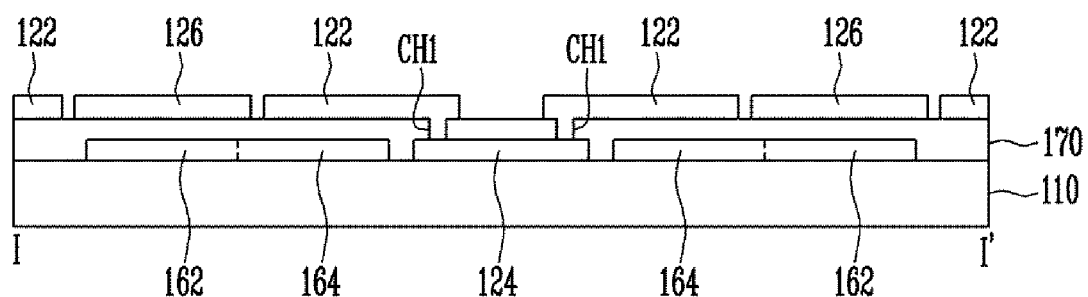

FIG. 8A shows an example of a cross section along line I-I' in FIG. 5.

Figure 8B:
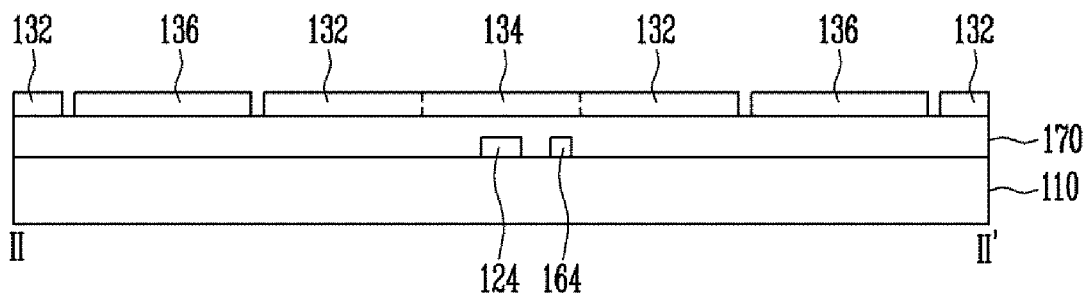

FIG. 8B shows an example of a cross section along line II-II' in FIG. 5.

Figure 9:
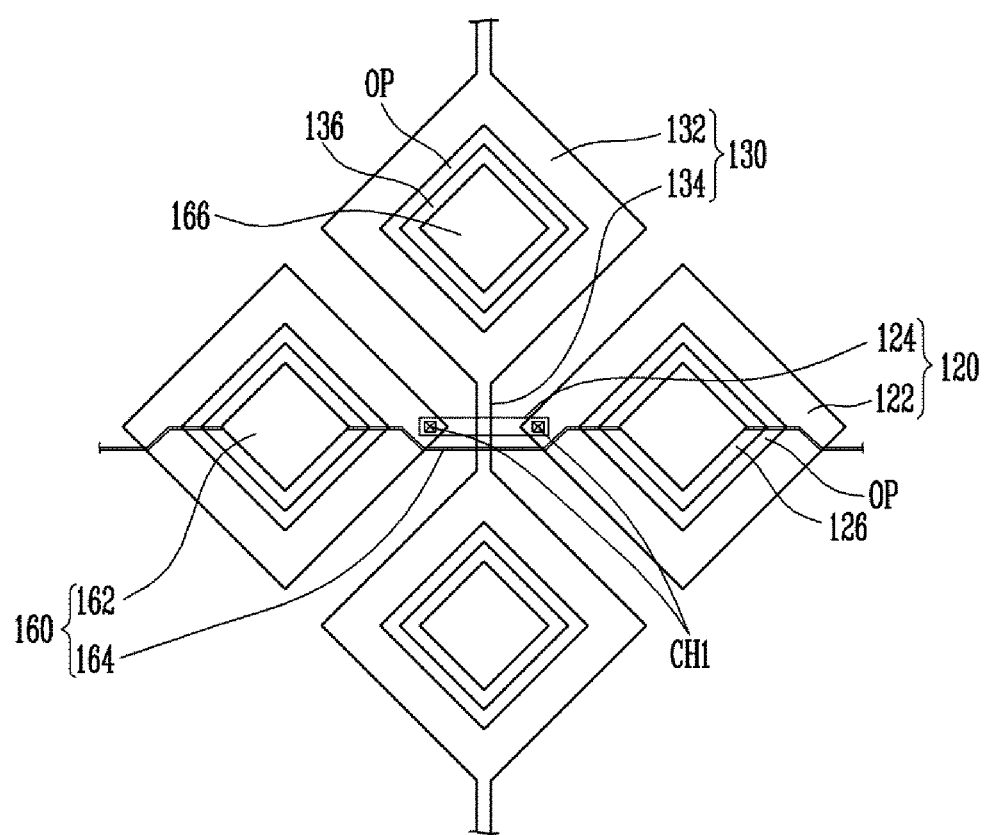

FIG. 9 shows an embodiment relating to the sensor part shown in FIG. 4.

Figure 10:
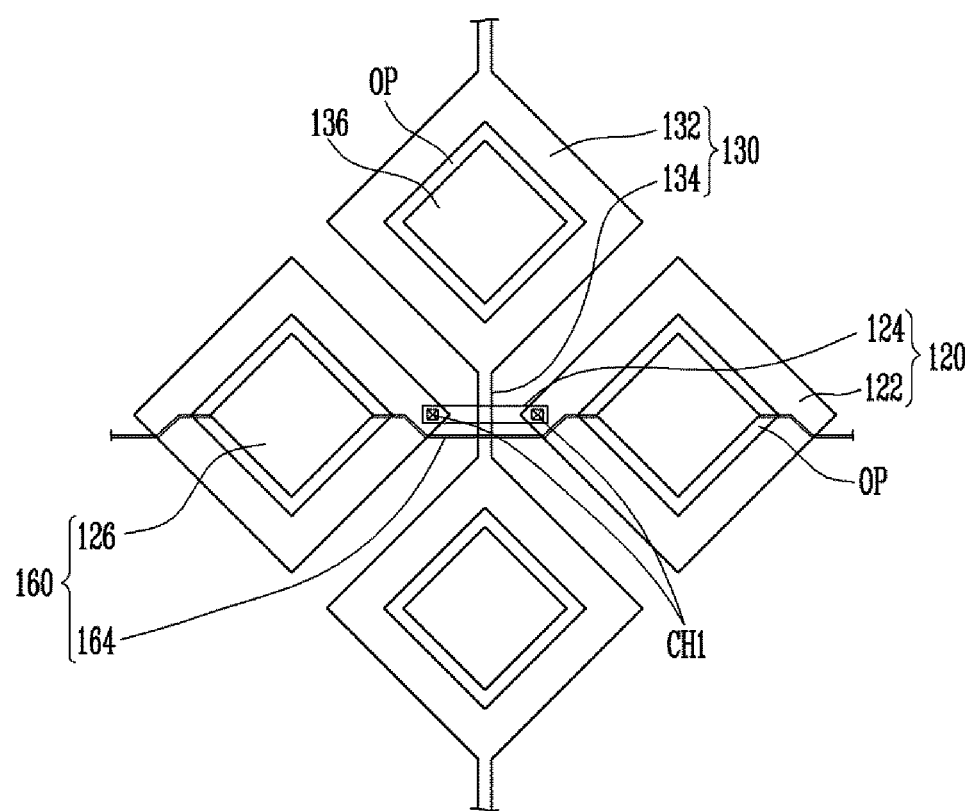

FIG. 10 shows an embodiment relating to the sensor part shown in FIG. 4.

Figure 11:
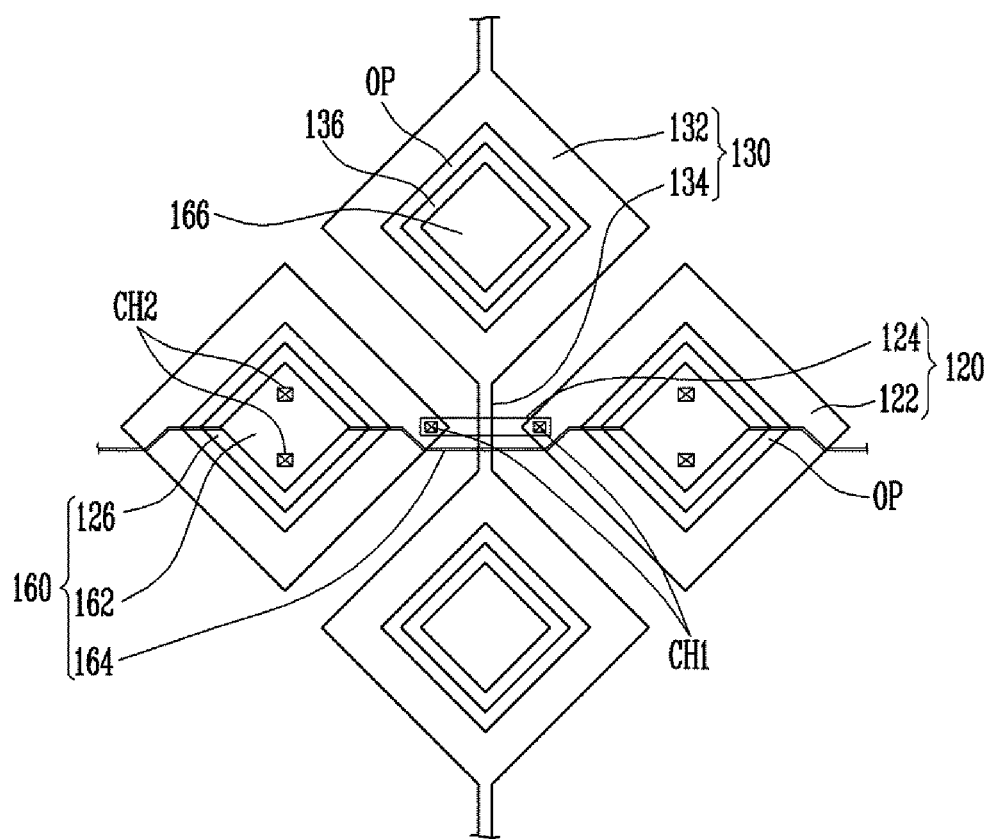

FIG. 11 shows an embodiment relating to the sensor part shown in FIG. 4.

Figure 12:
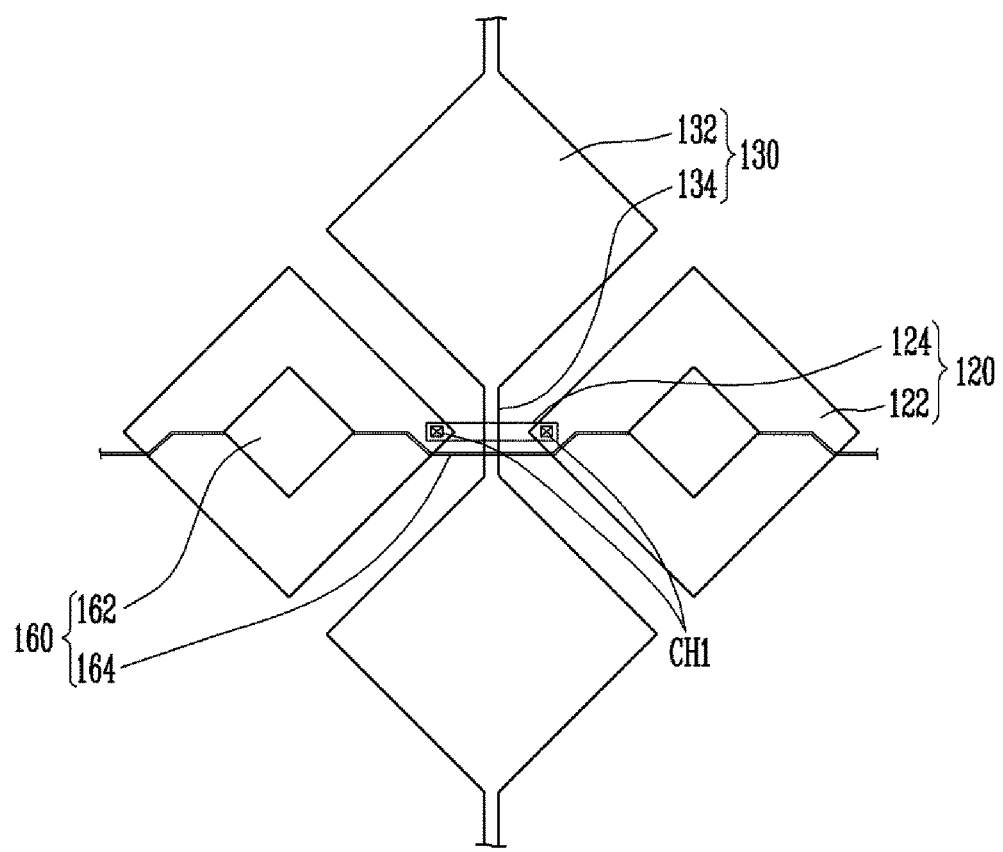

FIG. 12 shows an embodiment relating to the sensor part shown in FIG. 4.

Figure 13:
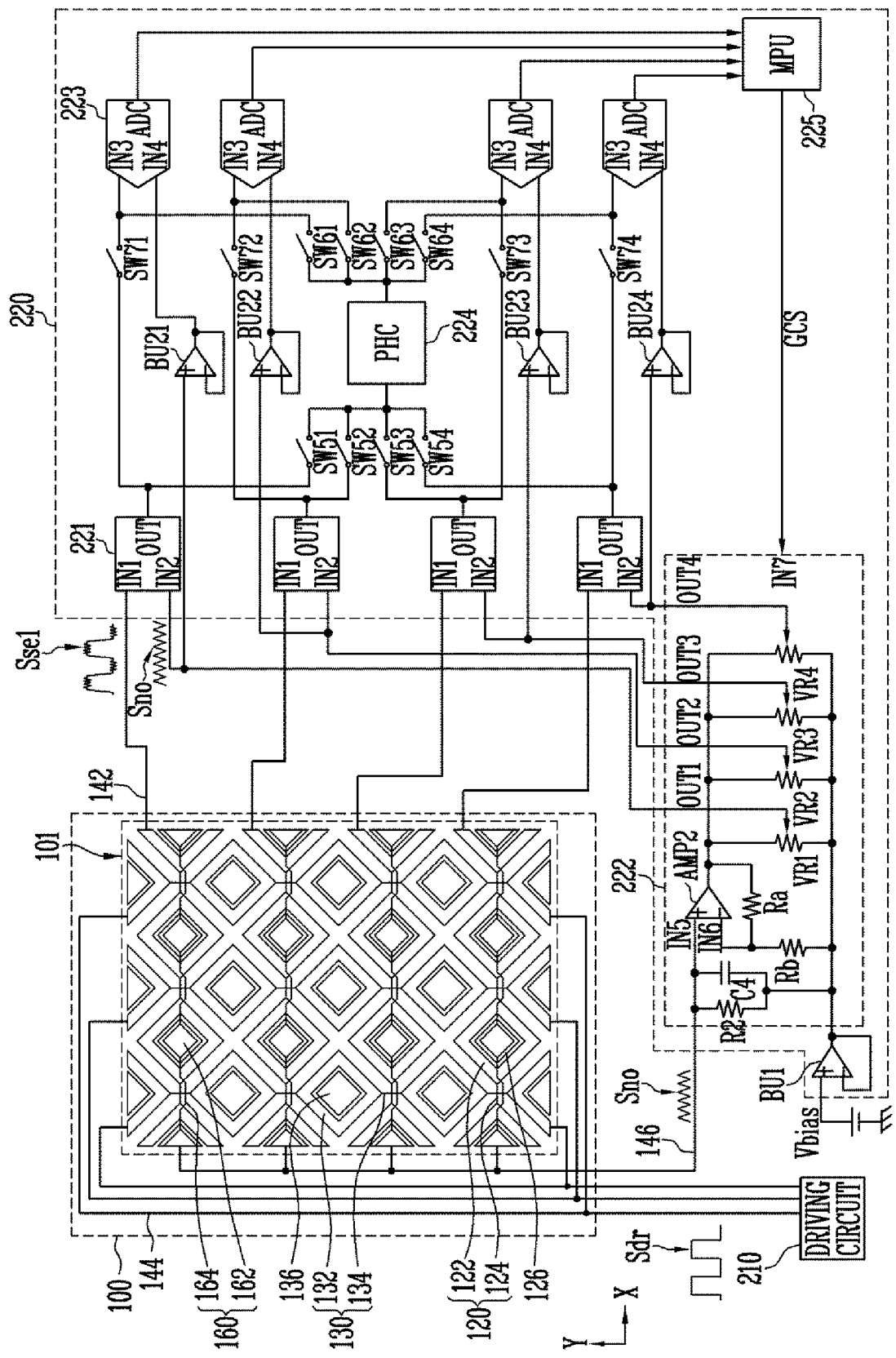
Figure 14:
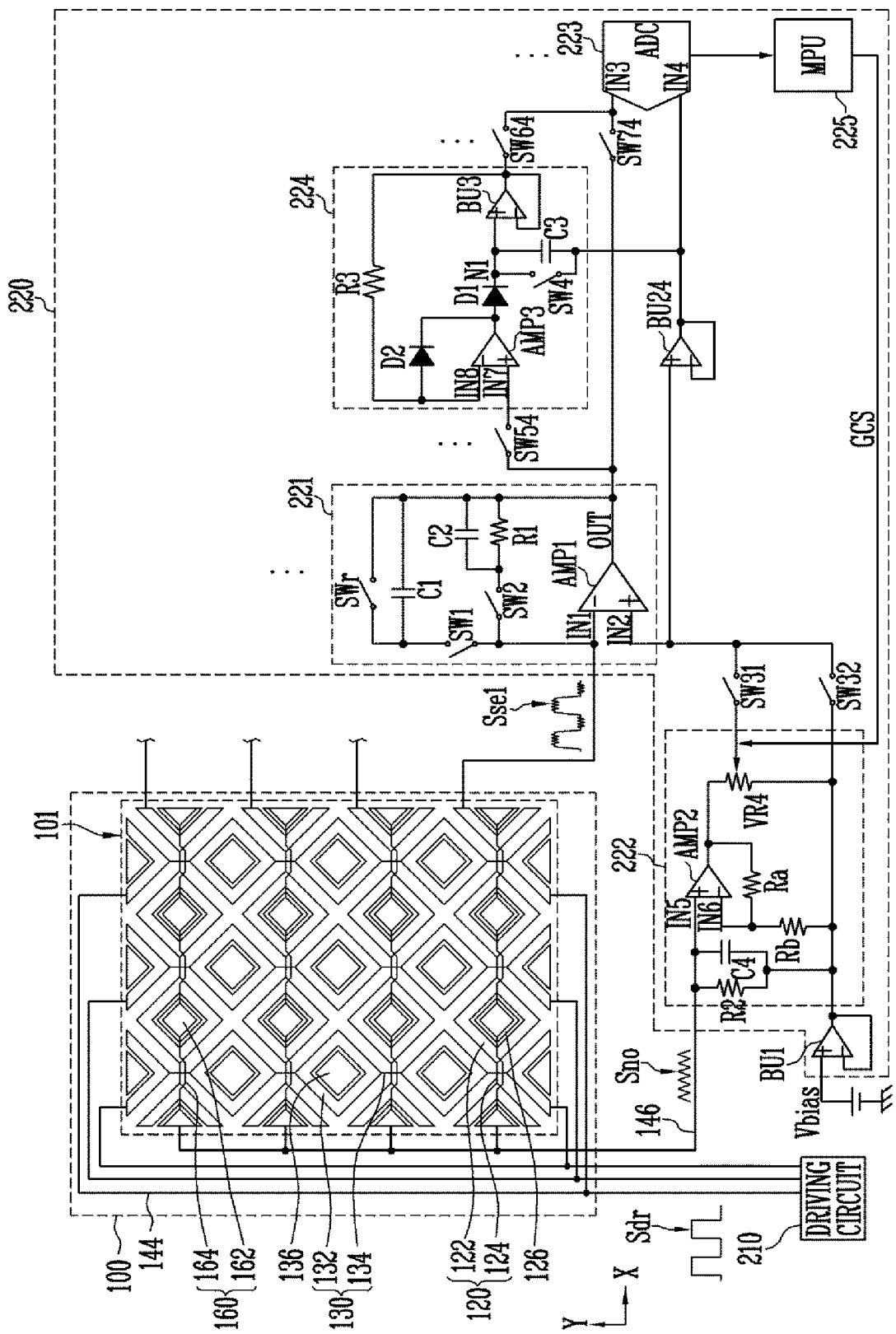

FIGS. 13 and 14 show a touch sensor according to an embodiment.

Figure 15:
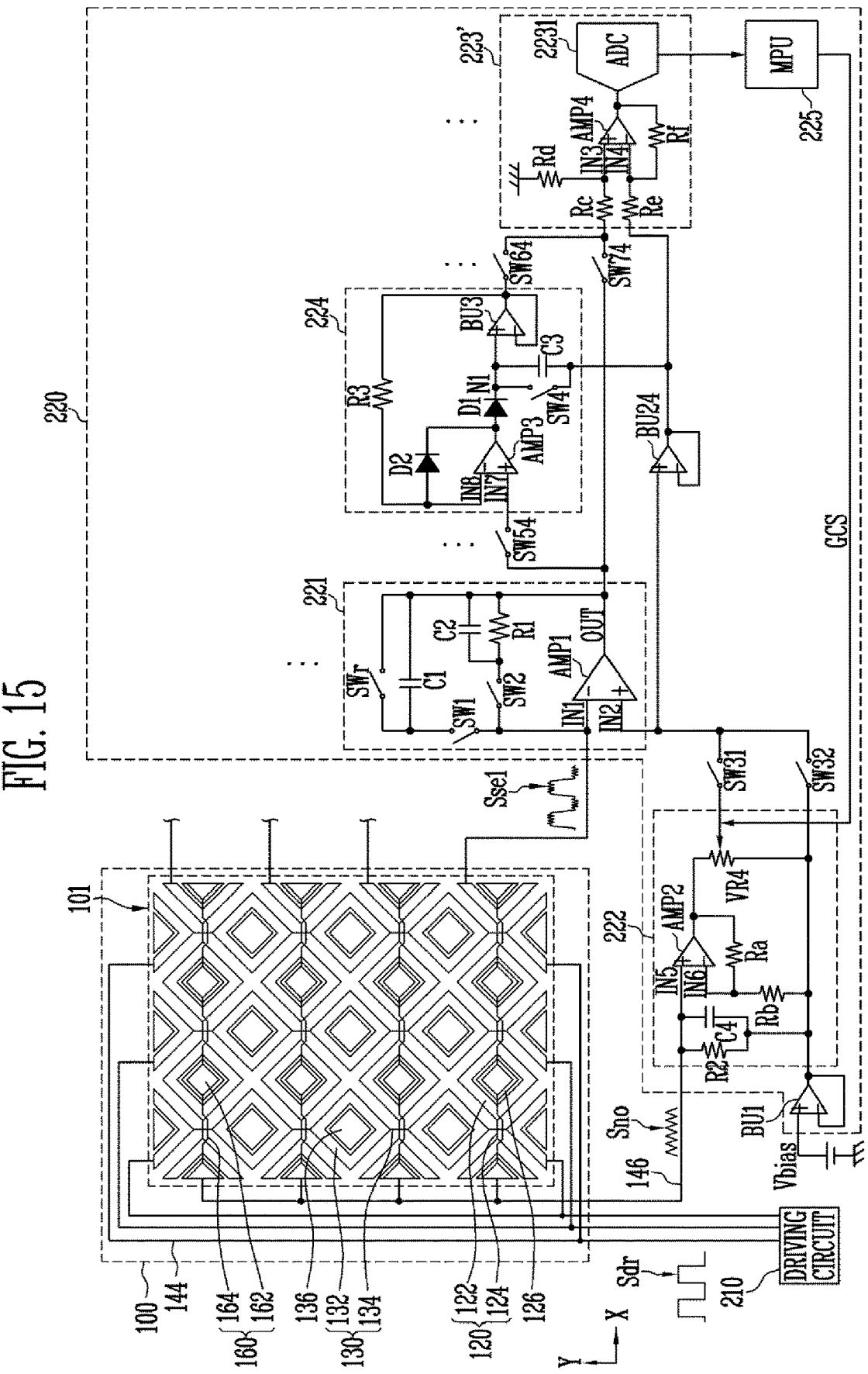

FIG. 15 shows an embodiment of an analog-to-digital converter shown in FIGS. 13 and 14.

Figure 16:
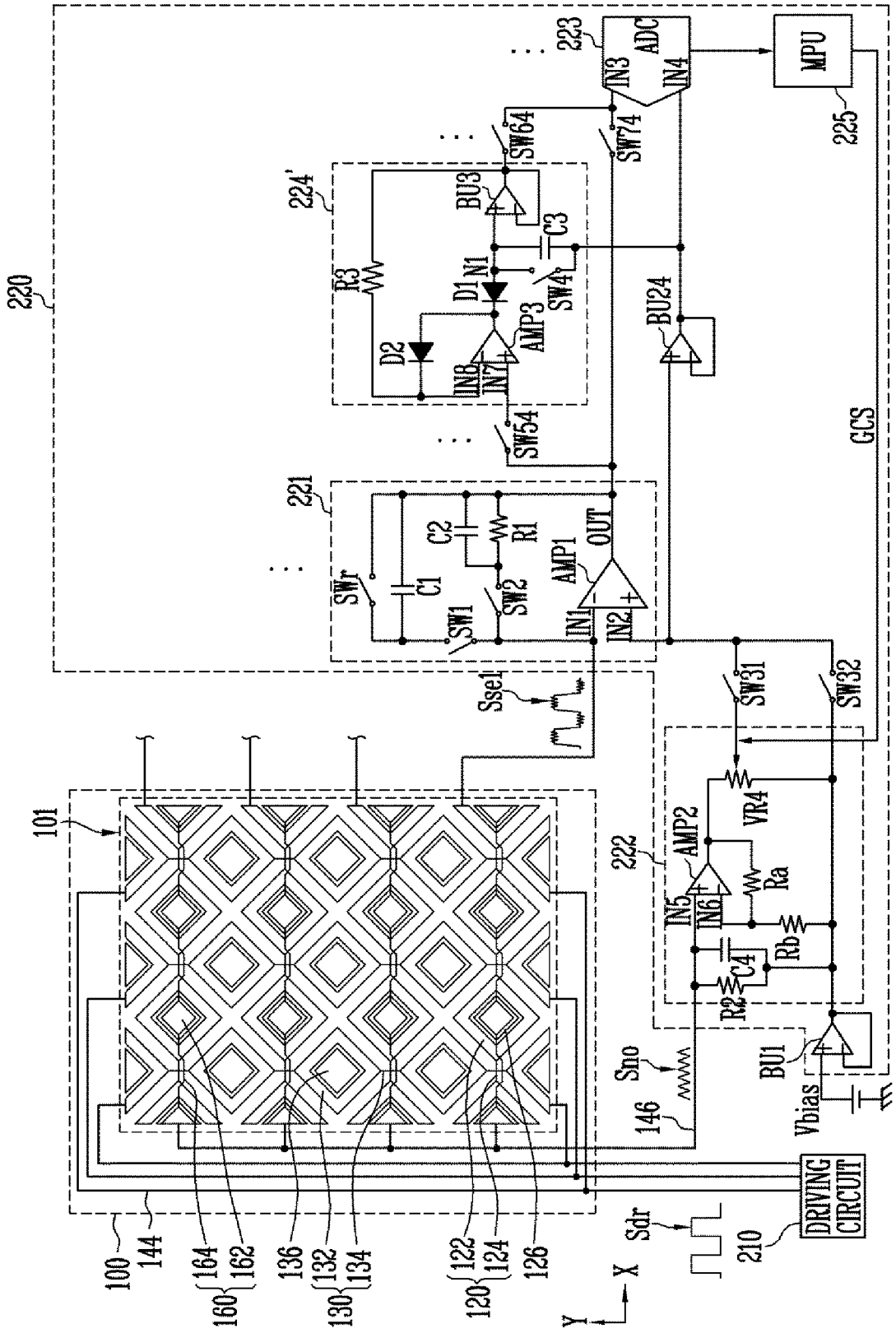

FIG. 16 shows an embodiment of a peak hold circuit shown in FIGS. 13 and 14.

Figure 17:
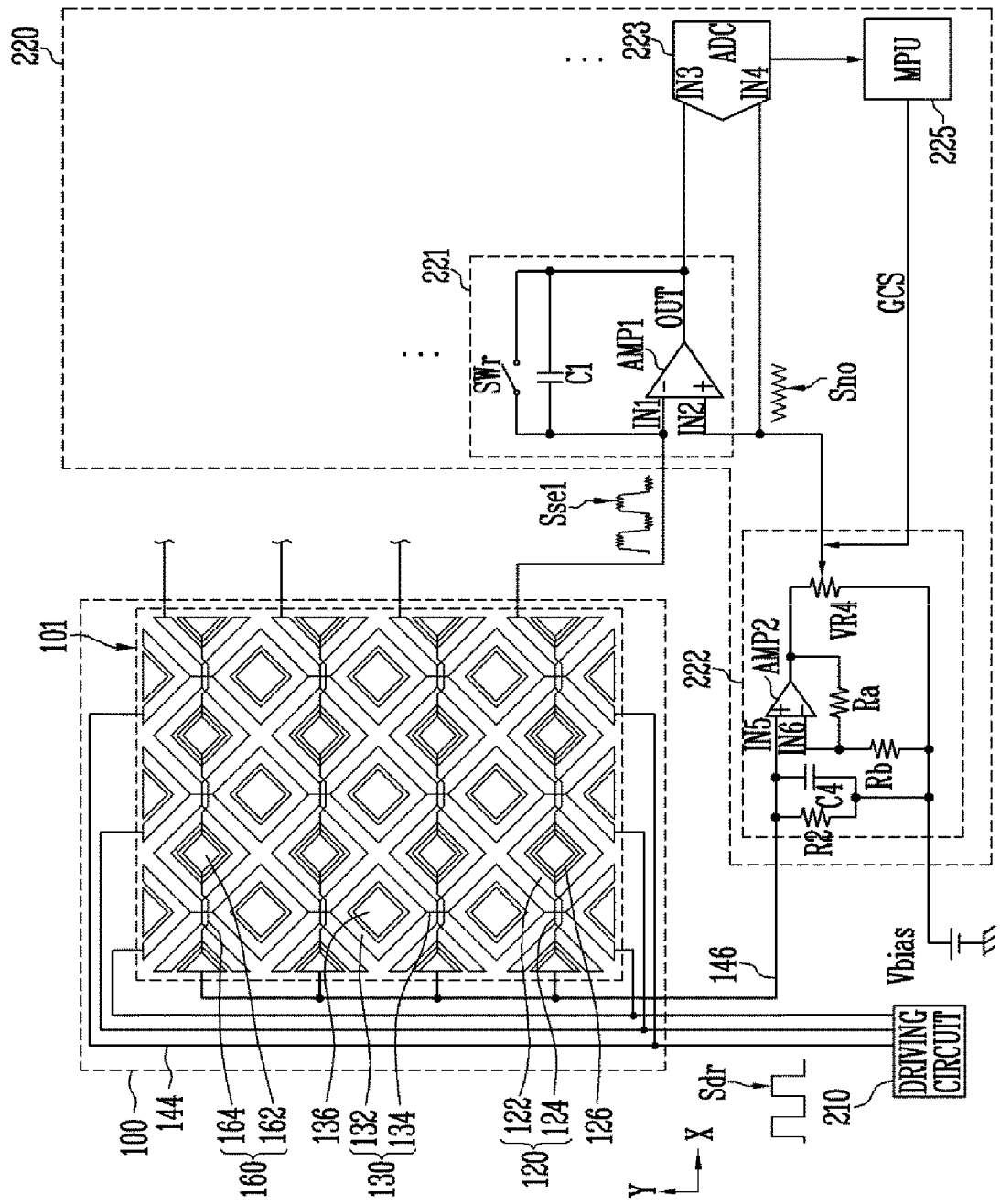

FIG. 17 shows operation of a touch sensor in a first mode according to an embodiment.

Figure 18:
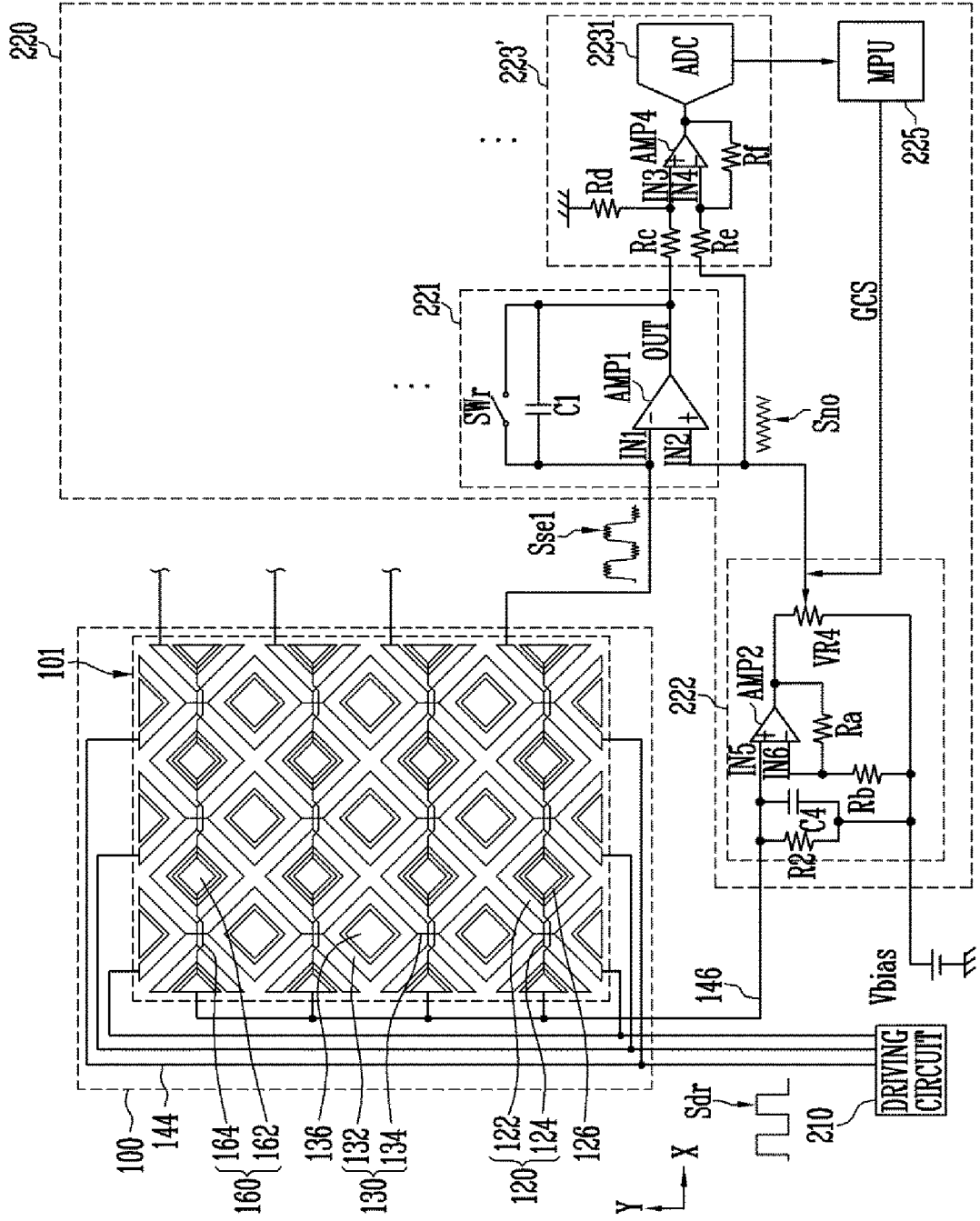

FIG. 18 shows operation of a touch sensor in a first mode in another embodiment.

Figure 19:
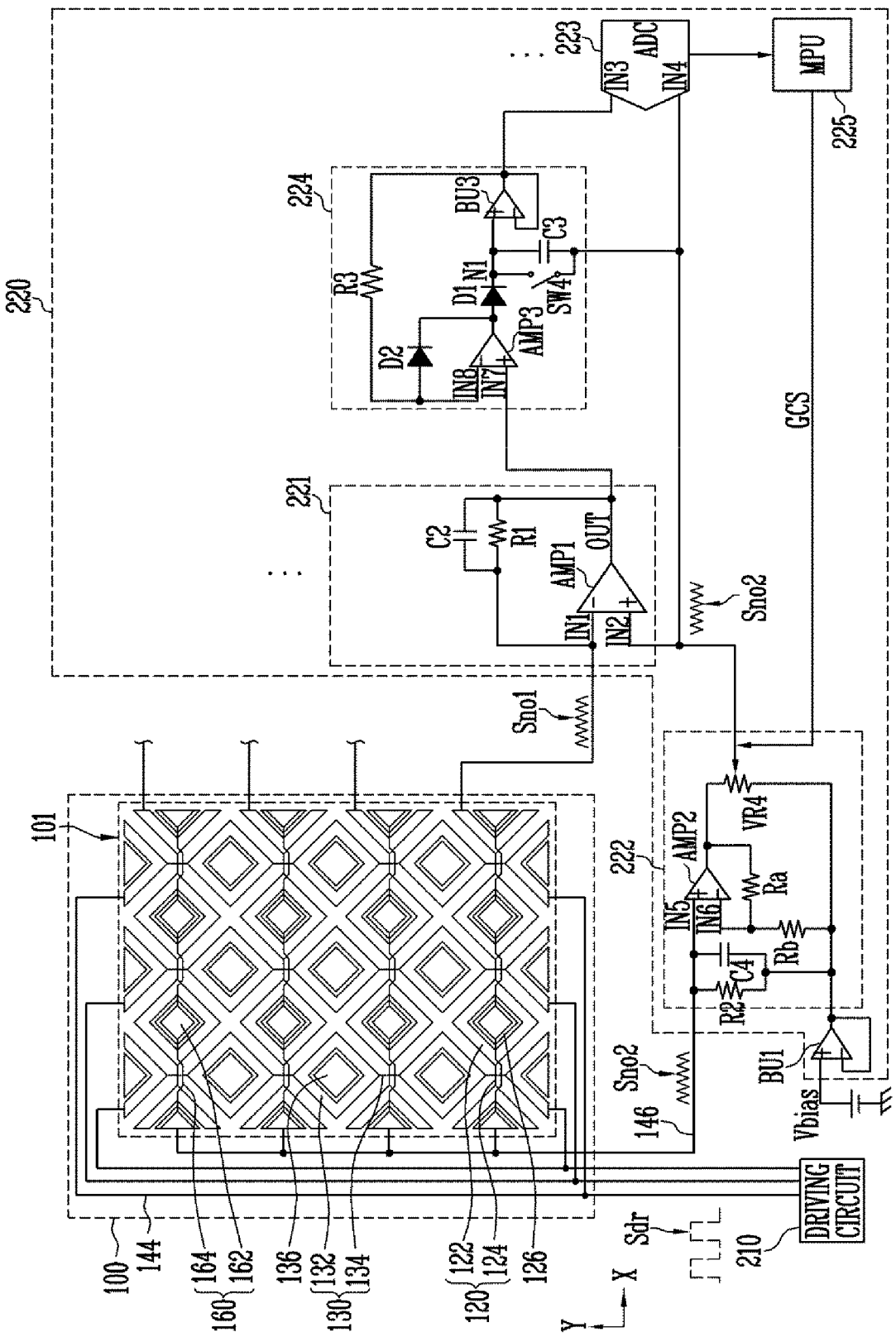

FIG. 19 shows operation of a touch sensor in a second mode according to an embodiment.

Figure 20:
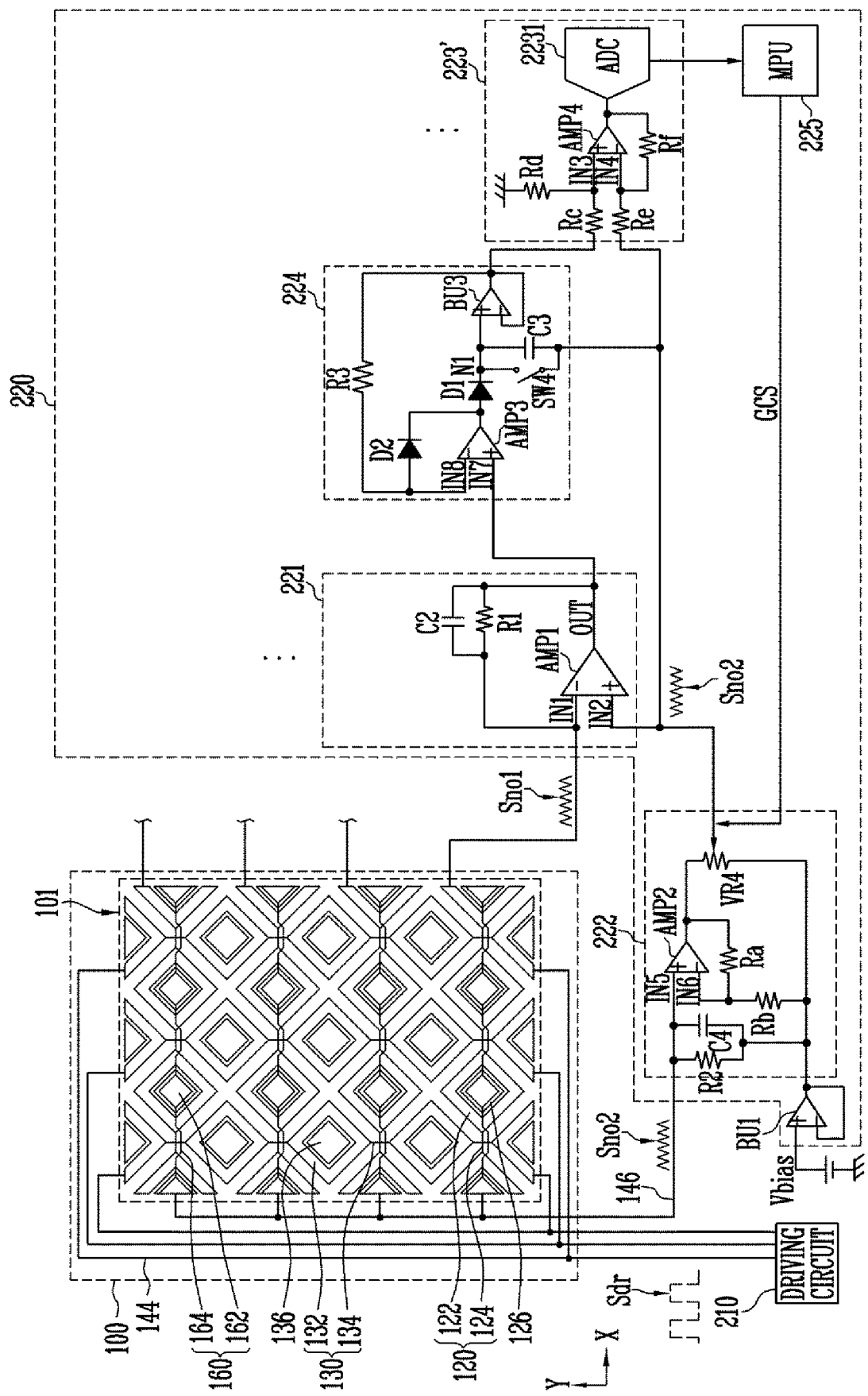

FIG. 20 shows operation of a touch sensor in a second mode in another embodiment.

Figure 21:
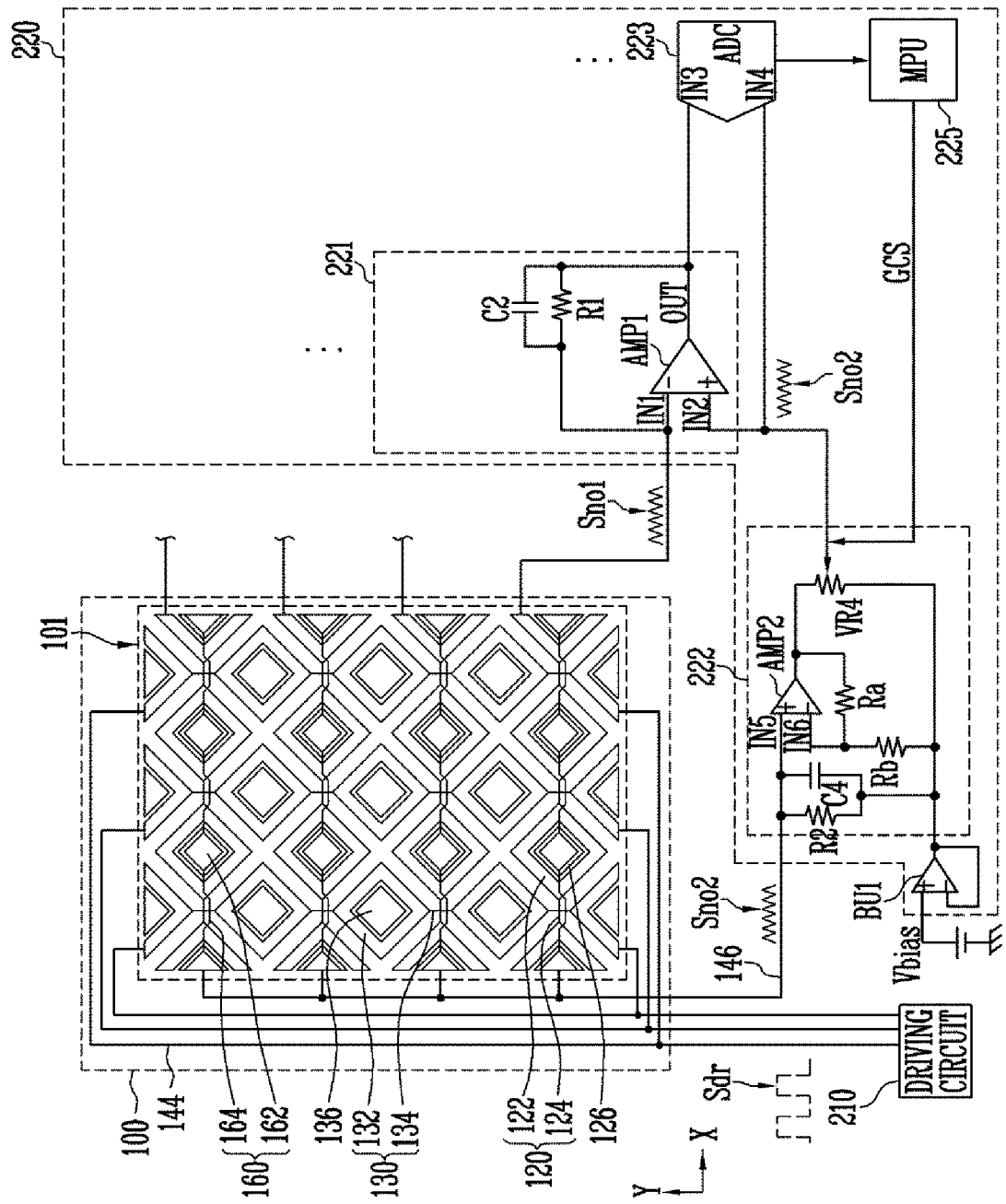

FIG. 21 shows a touch sensor and operation of the touch sensor in a second mode according to yet another embodiment.

DETAILED DESCRIPTION

Various exemplary embodiments of the present inventive concept will be described. In the drawings, elements and regions are not drawn to scale, and their sizes and thicknesses may be exaggerated for clarity. In the description of the present inventive concept, known configurations that are not central to the principles of the present inventive concept may be omitted. Throughout the drawings and corresponding description, the same components are denoted by the same reference numerals.

In the following detailed description, only certain exemplary embodiments of the present inventive concept have been shown and described, simply by way of illustration. As those skilled in the art would realize, the described embodiments may be modified in various different ways, all without departing from the spirit or scope of the present inventive concept. Accordingly, the drawings and description are to be regarded as illustrative in nature and not restrictive. In addition, it will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the inventive concept. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a schematic view showing a display device according to an embodiment. FIG. 2 shows a sensor part of a touch sensor according to an embodiment.

Referring to FIG. 1, a display device according to an embodiment may include a sensor part 100, a touch driver 200, a display panel 300 and a display driver 400. The sensor part 100 and the touch driver 200 may make up a touch sensor.

Although in FIG. 1 the sensor part 100 and the display panel 300 are shown as being separate from each other, it is not limited thereto. For example, but not by way of limitation, the sensor part 100 and the display panel 300 may be formed in one body.

In an embodiment, the sensor part 100 may be disposed on at least one area of the display panel 300. For example, but not by way of limitation, the sensor part 100 may be disposed on at least one side (or surface) of the display panel 300 and overlap the display panel 300. The sensor part 100 may be disposed on one side (for example, on a front side) in a direction that images are projected. In another embodiment, the sensor part 100 may be directly formed on at least one side or inside of the display panel 300. For example, but not by way of limitation, the sensor part 100 may be directly formed on an external side of an upper substrate and/or a lower substrate of the display panel 300 (e.g., the upper side of the upper substrate or the lower side of the lower substrate) or on an inner side (e.g., the lower side of the upper substrate or the upper side of the lower substrate) of the display panel 300.

The sensor part 100 may include an active area 101 capable of sensing touch input and a non-active area 102 surrounding at least a portion of the active area 101. In an embodiment, the active area 101 may be disposed corresponding to a display area 301 of the display panel 300, and the non-active area 102 may be disposed corresponding to a non-display area 302 of the display panel 300. For example, but not by way of limitation, the active area 101 of the sensor part 100 may overlap the display area 301 of the display panel 300, and the non-active area 102 of the sensor part 100 may overlap the non-display area 302 of the display panel 300.

In an embodiment, at least one electrode, for example, but not by way of limitation, a plurality of sensing electrodes 120 and driving electrodes 130, for detecting touch input may be provided in the active area 101. In other words, sensing electrodes 120 and driving electrodes 130 may be disposed on the display area 301 of the display panel 300. At least a portion of the sensing electrodes 120 and driving electrodes 130 may overlap at least one electrode provided in the display panel 300. For example, but not by way of limitation, if the display panel 300 is an organic light emitting display panel or a liquid crystal display panel, the sensing electrodes 120 and driving electrodes 130 may overlap at least a cathode electrode or a common electrode of the display panel 300.

The sensor part 100 may include a plurality of sensing electrodes 120 and driving electrodes 130 such that the sensing and driving electrodes 120 and 130 cross each other in the active area 101. For example, but not by way of limitation, there may be a plurality of sensing electrodes 120 extending along a first direction and a plurality of driving electrodes 130 extending along a second direction to cross the sensing electrodes 120 in the active area 101. In an embodiment, the sensing electrodes 120 and the driving electrodes 130 may be insulated from each other by at least one insulating layer which is not shown.

A capacitance Cse may be formed between the sensing electrodes 120 and the driving electrodes 130, particularly at a cross section thereof. The capacitance Cse may change when there is a touch input at a corresponding point or at a periphery thereof. Accordingly, touch input may be sensed by detecting change in the capacitance Cse.

The shape, size, arrangement direction, etc. of the sensing electrodes 120 and the driving electrodes 130 are not limited. In an embodiment related thereto, but not by way of limitation, the sensing electrodes 120 and the driving electrodes 130 may be configured as shown in FIG. 2. Although in FIGS. 1 and 2, a mutual capacitive touch sensor is shown as a touch sensor, but the touch sensor in an embodiment is not limited only to a mutual capacitive touch sensor.

Referring to FIG. 2, the sensor part 100 may include a base substrate 110 having an active area 101 and a non-active area 102, a plurality of sensing electrodes 120 and driving electrodes 130 disposed on the active area 101 on the base substrate 110, and a plurality of wires 140 and a pad part 150 disposed on the non-active area 102 on the base substrate 110. In another embodiment, if the touch sensor is a self-capacitive touch sensor, there may be a plurality of sensor electrodes distributed in the active area 101 which receive driving signal during one period of a touch driving period and output sensing signal during another period.

The base substrate 110 may be a substrate that becomes a base for the sensor part 100, and it may be a rigid substrate or a flexible substrate. For example, but not by way of limitation, the base substrate 110 may be a rigid substrate that is made of glass or reinforced glass or a flexible substrate that is made of a thin film of pliant plastic material. In an embodiment, the base substrate 110 may be one of the substrates that form the display panel 300. For example, but not by way of limitation, in an embodiment where the sensor part 100 and the display panel 300 are integrated in one body, the base substrate 110 may be at least one substrate (e.g., an upper substrate) that makes up the display panel 300 or a thin film encapsulation TFE.

The sensing electrodes 120 may extend along a first direction, for example, but not by way of limitation, along an X direction. In an embodiment, each of the sensing electrodes 120 in each row may include a plurality of first electrode cells 122 arranged along a first direction and first connecting parts 124 physically and/or electrically connecting the first electrode cells 122 of each row along the first direction. In an embodiment, the first connecting parts 124 may be formed as one body with the first electrode cells 122 or as a connection pattern as a bridge or in a bridge shape. In FIG. 2, the first connecting parts 124 are shown in an embodiment as being arranged in the first direction, but they are not limited thereto. For example, in another embodiment, the first connecting parts 124 may be arranged in a direction of a diagonal line that is inclined toward the first direction. In FIG. 2, the first connecting parts 124 are shown as having a straight shape (or a bar shape), but they are not limited thereto. For example, but not by way of limitation, the first connecting part 124 may have a shape in which at least one area is bent or flexed. In FIG. 2, two adjacent first electrode cells 122 are shown as being connected to each other through one first connecting part 124 disposed therebetween, but they are not limited thereto. For example, but not by way of limitation, in another embodiment, two adjacent first electrode cells 122 may be connected to each other through a plurality of first connecting parts 124 disposed therebetween.

In an embodiment, the first electrode cells 122 and/or first connecting parts 124 may include at least one of metal material, transparent conductive material and other various conductive materials, thus having conductivity. For example, but not by way of limitation, the first electrode cells 122 and/or the first connecting parts 124 may include at least one of various metal materials including gold (Au), silver (Ag), aluminum (Al), molybdenum (Mo), chrome (Cr), titanium (Ti), nickel (Ni), neodymium (Nd), copper (Cu), platinum (Pt), etc., or an alloy thereof. Also, the first electrode cells 122 and/or the first connecting parts 124 may include at least one of silver (Ag), silver nanowire (AgNW), indium tin oxide (ITO), indium zinc oxide (IZO), antimony zinc oxide (AZO), indium tin zinc oxide (ITZO), zinc oxide (ZnO) and various transparent conductive materials including tin oxide (SnO2), carbon nano tube, graphene, etc. In addition, the first electrode cells 122 and/or the first connecting parts 124 may include at least one of various conductive materials capable of providing conductivity. In an embodiment, each of the first electrode cells 122 and/or the first connecting parts 124 may be a single layer or multi layers.

In an embodiment, if the touch sensor is a mutual capacitive touch sensor, the sensing electrodes 120 may output sensing signal in response to driving signal input to the driving electrodes 130. For example, but not by way of limitation, the sensing electrodes 120 may be Rx electrodes outputting sensing signal corresponding to touch input.

The driving electrodes 130 may extend along a second direction, for example but not by way of limitation, along a Y direction. In an embodiment, each of the driving electrodes 130 disposed in each column may include a plurality of second electrode cells 132 arranged along the second direction and second connecting parts 134 physically and/or electrically connecting the second electrode cells 132 of each column along the second direction. In an embodiment, the second connecting parts 134 may be formed as one body with the second electrode cells 132 or as a connection pattern as a bridge or in a bridge shape. In FIG. 2, the second connecting parts 134 are shown in an embodiment as being arranged in the second direction, but they are not limited thereto. For example, in another embodiment, the second connecting parts 134 may be arranged in a direction of a diagonal line that is inclined toward the second direction. In FIG. 2, the second connecting parts 134 are shown as having a straight shape (or a bar shape), but they are not limited thereto. For example, but not by way of limitation, the second connecting part 134 may have a shape in which at least one area is bent or flexed. In FIG. 2, two adjacent second electrode cells 132 are shown as being connected to each other through one second connecting part 134 disposed therebetween, but they are not limited thereto. For example, but not by way of limitation, in another embodiment, two adjacent second electrode cells 132 may be connected to each other through a plurality of second connecting parts 134 disposed therebetween.

In an embodiment, the second electrode cells 132 and/or the second connecting parts 134 may include at least one of metal material, transparent conductive material and other various conductive materials, thus having conductivity. For example, but not by way of limitation, the second electrode cells 132 and/or the second connecting parts 134 may include at least one of the conductive materials mentioned above as the materials making up the first electrode cells 122 and/or the first connecting parts 124. In addition, the second electrode cells 132 and/or the second connecting parts 134 may be formed of the same material as the materials making up the first electrode cells 122 and/or the first connecting parts 124, or different material. In addition, each of the second electrode cells 132 and/or the second connecting parts 134 may be a single layer or multi layers.

In an embodiment, if the touch sensor is a mutual capacitive touch sensor, the driving electrodes 130 may receive a predetermined driving signal for driving the touch sensor. For example, but not by way of limitation, if the touch sensor in an embodiment is a mutual capacitive touch sensor, the driving electrodes 130 may be Tx electrodes receiving driving signal during a period when the touch sensor is activated.

In FIG. 2, the first and second electrode cells 122 and 132 are shown to have a diamond shape. However, the shapes, sizes, etc. of the first and second electrode cells 122 and 132 may vary. For example, but not by way of limitation, the first and second electrode cells 122 and 132 may have other shapes such as circular, hexagonal, etc.

In FIG. 2, each of the sensing electrodes 120 and the driving electrodes 130 is shown to be formed of a plurality of electrode cells 122 or 132 and the connecting parts 124 or 134. However, the shapes of the sensing electrodes 120 and/or driving electrodes 130 may vary. For example, but not by way of limitation, in another embodiment, the sensing electrodes 120 and the driving electrodes 130 may be implemented with rectangular bar type electrode extending along a first direction and a second direction, respectively.

In an embodiment, in the non-active area 102, there may be wires 140 for electrically connecting the sensing electrodes 120 and the driving electrodes 130 disposed in the active area 101 to a touch driver 200, etc. In an embodiment, the wires 140 may include first wires 142 for electrically connecting each sensing electrode 120 to the pad part 150 and second wires 144 for electrically connecting each driving electrode 130 to the pad part 150. For example, but not by means of limitation, each wire 140 may electrically connect any one of the sensing electrodes 120 and the driving electrodes 130 to a predetermined pad 152 provided to the pad part 150. In FIG. 2, for convenience of illustration, it is shown that the first wires 142 and the second wires 144 are connected only on one end of the sensing electrodes 120 and the driving electrodes 130, respectively, but a connection structure between the sensing electrodes 120 and the driving electrodes 130 and the first and second wires 142 and 144 may change. For example, but not by way of limitation, in another embodiment, at least one of the first wires 142 and the second wires 144 may be connected to both ends of the sensing electrodes 120 or the driving electrodes 130.

The pad part 150 may include many pads 152 for electrically connecting the sensing electrodes 120 and the driving electrodes 130 to an external driving circuit, for example, but not by way of limitation, the touch driver 200. The sensor part 100 and the touch driver 200 may communicate to each other through the pad part 150.

Referring to FIG. 1, the touch driver 200 may be electrically connected to the sensor part 100 and transmit/receive signal needed for driving the sensor part 100. For example, but not by way of limitation, the touch driver 200 may detect touch input by receiving a sensing signal in response to a driving signal from the sensor part 100 after supplying the driving signal to the sensor part 100. The touch driver 200 may include a driving circuit and a sensing circuit. In an embodiment, the driving circuit and the sensing circuit may be integrated into a touch IC T-IC in the touch driver 200 but they are not limited thereto.

In an embodiment, the driving circuit may be electrically connected to the driving electrodes 130 of the sensor part 100 and sequentially supply driving signals to the driving electrodes 130. In an embodiment, the sensing circuit may be electrically connected to the sensing electrodes 120 of the sensor part 100, receive sensing signal from the sensing electrodes 120 and detect touch input by performing signal processing.

The display panel 300 may include the display area 301 and the non-display area 302 surrounding at least one area of the display area 301. A plurality of scan lines 310 and data lines 320, and a plurality of pixels P connected to the scan lines 310 and the data lines 320 may be provided in the display area 301. Various driving signal for driving the pixels P and/or wires for supplying driving power may be provided in the non-display area 302.

The type of display panel 300 is not limited. For example, but not by way of imitation, the display panel 300 may be a self-luminescence display panel such as an organic light emitting display panel. The display panel 300 may be a non self-emissive display panel such as a liquid crystal display panel, an electro-phoretic display panel and an electro-wetting display panel. If the display panel 300 is a non-self-emissive display panel, the display device may further include a back-light unit for supplying light to the display panel 300.

The display driver 400 may be electrically connected to the display panel 300 and supply signal needed for driving the display panel 300. For example, but not by way of limitation, the display driver 400 may include at least one of a scan driver supplying scan signal to the scan lines 310, a data driver supplying data signal to the data lines 320, and a timing controller for driving the scan driver and the data driver. In an embodiment, the scan driver, the data driver and/or the timing controller may be integrated into one display IC D-IC, but they are not limited thereto. For example, but not by way of limitation, in another embodiment, at least one of the scan driver, the data driver and a timing controller may be integrated or mounted on the display panel 300.

FIG. 3 shows a touch sensor according to an embodiment. For convenience, in FIG. 3, one sensing electrode 120 and one driving electrode 130 of sensing electrodes 120 and driving electrodes 130 provided in the sensor part 100 and capacitance Cse formed at a cross section thereof are shown. In FIG. 3, a driving circuit 210 and a sensing circuit 220 which is focused on the sensing electrode 120 and the driving electrode 130 forming the capacitance Cse are shown.

Referring to FIG. 3, the sensor part 100 may include the at least a pair of the sensing electrode 120 and the driving electrode 130 which form a capacitance Cse. The driving electrode 130 may be electrically connected to the driving circuit 210 of a touch driver 200, and the sensing electrode 120 may be electrically connected to a sensing circuit 220 of the touch driver 200. For convenience, in FIG. 3, the driving circuit 210 and the sensing circuit 220 are drawn as separated from each other, but they are not limited thereto. For example, but not by way of limitation, the driving circuit 210 and the sensing circuit 220 may be separated from each other, or at least a portion of the driving circuit 210 and the sensing circuit 220 may be integrated in one body.

A method of driving the touch sensor may include supplying a driving signal Sdr to a driving electrode 130 from the driving circuit 210. If the sensor part 100 includes a plurality of driving electrodes 130 as shown in FIGS. 1 and 2, the driving circuit 210 may supply the driving signals Sdr to the driving electrodes 130 sequentially. A sensing signal Sse in response to the driving signal Sdr applied to each driving electrode 130 may be output from each sensing electrode 120 due to a coupling effect of the capacitance Cse in the sensor part 100. The sensing signal Sse may be input to the sensing circuit 220 of the touch driver 200. If the sensor part 100 includes a plurality of sensing electrodes 120 as shown in FIGS. 1 and 2, the sensing circuit 220 may include a plurality of sensing channels electrically connected to each sensing electrode 120 (hereinafter, referred to as "Rx channels"). Sensing signal outputs from the plurality of sensing electrodes 120 may be received through the Rx channels. In an embodiment, each of the Rx channels may include at least a signal receiving part 221.

The sensing circuit 220 may amplify, convert and process the sensing signal Sse input from each sensing electrode 120 through the Rx channel and detect the touch input accordingly. The sensing circuit 220 may include a signal receiving part 221, an analog-to-digital converter part 223 and a processor 225.

The signal receiving part 221 may receive sensing signal Sse from each sensing electrode 120 through the Rx channel. In an embodiment, the touch sensor may include a plurality of signal receiving parts 221 connected to each of the plurality of sensing electrodes 120 through the Rx channel. The signal receiving part 221 may be included in each of the Rx channels.

The signal receiving part 221 may amplify and output an amplified sensing signal Sse to the ADC 223. For example, but not by way of limitation, the signal receiving part 221 may be implemented with an analog front end (AFE) that includes a first amplifier AMP1. In an embodiment, the first amplifier AMP1 may be an operational amplifier. In an embodiment, a first input terminal (or a first terminal) IN1 of the signal receiving part 221, e.g., an inverting input terminal of the first amplifier AMP1 may be electrically connected to the sensing electrode 120 of the applicable Rx channel. That is, the sensing signal Sse from the sensing electrode 120 may be input to the first input terminal IN1 of the first amplifier AMP1. A first capacitor C1 and a reset switch SWr may be connected in parallel between the first input terminal IN1 and the output terminal OUT of the first amplifier AMP1. Meanwhile, a second input terminal (or a second terminal) IN2 of the signal receiving part 221, e.g., a non-inverting input terminal of the first amplifier AMP1, is a reference terminal and may be electrically connected to, for example, but not by way of limitation, a ground GND power.

The analog-to-digital converter part 223 may convert an analog signal input from the signal receiving part 221 into a digital signal. In an embodiment, the analog-to-digital converter parts 223 may be provided as many as the number of the sensing electrodes 120 to correspond to each Rx channel corresponding to each sensing electrode 120 at a ratio of 1:1. In another embodiment, a plurality of Rx channels corresponding to a plurality of sensing electrodes 120 may be configured to share one analog-to-digital converter part 223. A switching circuit for channel selection may be additionally provided between each of the signal receiving parts 221 and the analog-to-digital converter parts 223.

A processor 225 may perform signal processing on the digital signal converted by the analog-to-digital converter part 223 and detect a touch input according to the signal processing result. For example, but not by way of limitation, the processor 225 may detect whether there is an occurrence of a touch input and a position thereof by comprehensively analyzing a sensing signal input, that is, the sensing signal Sse that is amplified and digital converted, via the signal receiving part 221 and the analog-to-digital converter part 223 from a plurality of sensing electrodes 120. In an embodiment, the processor 225 may be implemented with a micro processor MPU. A memory that is needed for driving the processor 225 may be additionally provided in the sensing circuit 220. However, the configuration of the processor 225 is not limited thereto. For example, but not by way of limitation, the memory may be integrated into a microcontroller MCU, etc.

The touch sensor described above may be combined with a display panel 300, etc. For example, but not by way of limitation, the sensor part 100 of the touch sensor may be manufactured in one body with the display panel 300 or may be manufactured separately from the display panel 300 and the separately manufactured sensor part 100 of the touch sensor may be combined with at least one side of the display panel 300.

As such, if the sensor part 100 and the display panel 300 are combined together, a parasitic capacitance may occur between the sensor part 100 and the display panel 300. Due to the coupling effect of the parasitic capacitance, the noise from the display panel 300 may be transmitted to the touch sensor, particularly the sensor part 100. For example, but not by way of limitation, the noise due to the display driving signal used for driving the display panel 300 may affect the sensor part 100. For example, but not by way of limitation, the sensing electrodes 120 and the driving electrodes 130 may overlap the cathode electrode or the common electrode. Display noise (common mode noise) due to the display driving signal applied to the cathode electrode or the common electrode may affect the sensor part 100.

The noise from the display panel 300 may cause ripple of sensing signal Sse, and thus sensitivity of the touch sensor may decrease as a result. Various embodiments capable of enhancing sensitivity of touch sensor will be described subsequently.

FIG. 4 shows a touch sensor according to an embodiment. For convenience, the base substrate, the pad part, etc. shown in FIG. 2 are omitted in FIG. 4, the sensor part in FIG. 4 may be implemented on the base substrate. In FIG. 4, same reference numerals are used with respect to the similar or same components, and detailed description thereof is omitted.

Referring to FIG. 4, in an embodiment, the touch sensor may include a sensor part 100, a driving circuit 210 and a sensing circuit 220 electrically connected to the sensor part 100. In an embodiment, the sensor part 100 may further include a plurality of noise detecting electrodes 160 extending in the same direction as the sensing electrodes 120 such that they will make pairs with the sensing electrodes 120.

The sensor part 100 may include at least a pair of a sensing electrode (first electrode) 120 and a noise detecting electrode (second electrode) 160. The sensing electrode 120 and the noise detecting electrode 160 are spaced apart from each other. The sensor part 100 may further include at least one driving electrode (third electrode) 130 crossing the pair of sensing electrode 120 and noise detecting electrode 160.

For example, but not by way of limitation, the sensor part 100 may include a plurality of sensing electrodes (first electrodes) 120 and a plurality of noise detecting electrodes (second electrodes) 160 making pairs with the sensing electrodes 120. The sensor part 100 may include a plurality of driving electrodes (third electrodes) 130 crossing the sensing electrodes 120 and the noise detecting electrodes 160.

At least a portion of the sensing electrodes 120, the driving electrodes 130 and the noise detecting electrodes 160 may have an area that overlaps and/or crosses each other, but they may be insulated from one another with insulating layers (not shown) disposed therebetween. That is, the sensing electrodes 120, the driving electrodes 130 and the noise detecting electrodes 160 may be distanced apart and electrically insulated from each other, and a capacitance may be formed therebetween.

In an embodiment, the sensing electrodes 120 may extend along a first direction in an active area 101, and the driving electrodes 130 may extend along a second direction in the active area 101 to cross the sensing electrodes 120. The noise detecting electrodes 160 may extend along the first direction in the active area 101 as the sensing electrodes 120, and an area of the noise detecting electrodes 160 may overlap the sensing electrodes 120.

In an embodiment, each of the sensing electrodes 120 may include a plurality of first electrode cells 122 and a plurality of connecting parts 124 connecting the first electrode cells 122 along the first direction. For example, but not by way of limitation, each of the sensing electrodes 120 may include a plurality of first electrode cells 122 arranged along the first direction. The first electrode cells 122 arranged in each row line (or column line) may be connected along the first direction by the first connecting parts 124. Meanwhile, the shapes of the sensing electrodes 120 are not limited thereto. For example, but not by way of limitation, each of the sensing electrodes 120 may be implemented as a one-body bar type electrode.

In an embodiment, each of the first electrode cells 122 may include at least one opening (or a hole) inside of it. For example, but not by way of limitation, each of the first electrode cells 122 may have a central open part.

In an embodiment, in the opening of each of the first electrode cells 122, there may be a first dummy pattern 126 that is spaced apart from the each of the first electrode cells 122. In an embodiment, the first dummy patterns 126 and the first electrode cells 122 may be formed of the same material and may be formed on the same layer, but they are not limited thereto.

Meanwhile, the first dummy patterns 126 should not be understood to be limiting. For example, but not by way of limitation, no opening may be formed inside each first electrode cell 122, or the first dummy patterns 126 may be omitted.

In an embodiment, an electrode part 162 of the noise detecting electrode 160 may be disposed inside each sensing electrode 120. For example, but not by way of limitation, each of the electrode parts 162 of the noise detecting electrodes 160 may be surrounded by respective one of the sensing electrodes 120. The each of the electrode parts 162 of the noise detecting electrodes 160 may be completely surrounded by respective one of the sensing electrodes 120.

In an embodiment, each of the noise detecting electrodes 160 may include a plurality of electrode parts 162 arranged along the first direction. In an embodiment, each of the electrode parts 162 may be spaced apart from the first electrode cells 122 and physically not connected to the first electrode cells 122. For example, but not by way of limitation, each of the electrode parts 162 may be positioned to overlap each of the first dummy patterns 126 in the opening provided inside each of the first electrode cells 122.

In an embodiment, each of the electrode parts 162 may have the same area as, or a different area from, the corresponding first dummy pattern 126. For example, but not by way of limitation, a pair of electrode part 162 and first dummy pattern 126 that overlap each other may have the same area as each other and completely overlap each other. In FIG. 4, in order to clearly distinguish the electrode part 162 from the first dummy pattern 126, the embodiment shows that they have different areas from each other, for example, each of the electrode parts 162 has a smaller area than each of the first dummy patterns 126 and is provided inside the area where the first dummy pattern 126 is provided.

The electrode parts 162 disposed on the same row (or column) along the first direction may form noise detecting electrodes 160 by being electrically connected along the first direction through connection lines 164. Each of the noise detecting electrodes 160 may include a plurality of electrode parts 162 surrounded by each of the first electrode cells 122 and a plurality of connection lines 164 physically and/or electrically connecting the electrode parts 162 along the first direction.

In an embodiment, the electrode parts 162 and/or the connection lines 164 may include at least one of a metal material, a transparent conductive material and other various conductive materials, thereby having conductivity. For example, but not by way of limitation, the electrode parts 162 and/or the connection lines 164 may include at least one of the conductive materials mentioned above as materials for forming the first electrode cells 122, the first connecting parts 124, the second electrode cells 132 and/or the second connecting part 134. The electrode parts 162 and/or the connection lines 164 may be formed of the same materials as, or different materials from, the first electrode cells 122, the first connecting parts 124, the second electrode cells 132 and/or the second connecting parts 134. Each of the electrode parts 162 and/or the connection lines 164 may be a single layer or multi layers.

In an embodiment, each of the noise detecting electrodes 160 may be electrically connected to the sensing circuit 220 via each third wire 146. In an embodiment, a buffer BU may be disposed between each of the noise detecting electrodes 160 and the corresponding signal receiving part 221. The buffer BU may be electrically connected between the noise detecting electrode 160 and the signal receiving part 221 that correspond to each other, buffer the signal input from the noise detecting electrode 160 (e.g., a noise signal Sno) and output it to the signal receiving part 221 in the sensing circuit 220. In an embodiment, the inverting input terminal of the buffer BU may be electrically connected to the output terminal of the buffer BU, and the non-inverting input terminal of the buffer BU may be electrically connected to the corresponding noise detecting electrode 160 and receive the noise signal Sno.

In an embodiment, a sensing electrode 120 and a noise detecting electrode 160 disposed in an area that correspond to each other among the sensing electrodes 120 and the noise detecting electrodes 160 may make a pair. For example, but not by way of limitation, the sensing electrode 120 disposed in the first row of the active area 101 and the noise detecting electrode 160 disposed in the first row that includes the electrode part 162 disposed in the opening inside the sensing electrode 120 may make a pair.

In an embodiment, a pair of sensing electrode 120 and noise detecting electrode 160 may have at least one overlapping area. For example, but not by way of limitation, the connection lines 164 electrically connecting a plurality of electrode parts 162 may overlap the first electrode cells 122. The connection lines 164 may be disposed on a layer that is different from the layer on which the first electrode cells 122 are disposed. Consequently, the sensing electrodes 120 and the noise detecting electrodes 160 may be electrically insulated from each other.

The first connecting parts 124 may be connected in one body with the first electrode cells 122 on the same layer as the first electrode cells 122 or may be disposed on a layer different from the layer on which the first electrode cells 122 are disposed and electrically connected to the first electrode cells 122 via contact holes. For example, but not by way of limitation, the first connecting parts 124 may be provided on the same layer as the electrode parts 162 and/or the connection lines 164 but not overlap the electrode parts 162 and/or the connection lines 164.

In an embodiment, the second electrode cells 132 may include at least one opening (or hole) inside of it as is the case with the first electrode cells 122. For example, but not by way of limitation, the second electrode cells 132 may have an opening at a center.

Also, in an embodiment, inside the openings of the second electrode cells 132, there may be provided second dummy patterns 136 that are spaced apart from the second electrode cells 132. For example, but not by way of limitation, inside the openings of the second electrode cells 132, there may be provided second dummy patterns 136 that are spaced apart from the second electrode cells 132 on the same layer as the second electrode cells 132. In an embodiment, the second dummy patterns 136 may be formed of the same materials as the second electrode cells 132, but they are not limited thereto.

As such, if the driving electrodes 130 have a similar structure and/or shape to the sensing electrodes 120, uniform viewing (or visual) characteristics may be secured throughout in the active area 101. However, it is not limited thereto. For example, but not by way of limitation, no opening may be formed inside the second electrode cells 132, or second dummy patterns 136 may be omitted.

Meanwhile, FIG. 4 shows that the sensing electrodes 120, the driving electrodes 130 and the noise detecting electrodes 160 including electrode cells 122 and 132 or electrode parts 162 that are board shaped, however, they are not limited thereto. For example, but not by way of limitation, in another embodiment, at least one of the sensing electrodes 120, the driving electrodes 130 and the noise detecting electrodes 160 may be electrodes having mesh shape.

The driving circuit 210 may be electrically connected to the driving electrodes 130 and may supply the driving signals Sdr to the driving electrodes 130. For example, but not by way of limitation, the driving circuit 210 may supply the driving signals Sdr sequentially to the driving electrodes 130 during a period where the touch sensor is activated. In an embodiment, the driving signals Sdr may be an alternate current signal having a predetermined cycle as a pulse wave.

The sensing circuit 220 may include a plurality of signal receiving parts 221 receiving sensing signal Sse1 from each of the sensing electrodes 120, a plurality of analog-to-digital converter parts 223 electrically connected to each output terminal of the signal receiving parts 221, and a processor 225 detecting touch input by receiving signals digitally converted from the analog-to-digital converter parts 223. The signal receiving part 221, the analog-to-digital converter part 223 and the processor 225 have been described with reference to embodiment of FIG. 3 above so detailed description will be omitted.

In an embodiment in FIG. 4, first and second input terminals IN1 and IN2 of the signal receiving parts 221 may be electrically connected to a respective sensing electrode 120 and a respective noise detecting electrode 160. For example, but not by way of limitation, the first input terminal IN1 of the first signal receiving part 221 that receives the sensing signal Sse1 from the sensing electrode 120 positioned in the first row of the active area 101 may be electrically connected to the sensing electrode 120 of the first row, and the second input terminal IN2 of the first signal receiving part 221 may be electrically connected to the noise detecting electrode 160 of the first row. In an embodiment, each of the signal receiving parts 221 may include a first amplifier AMP1 including first and second input terminals IN1 and IN2, and the second input terminal IN2 may be a reference terminal (or a ground terminal) of the signal receiving part 221 (e.g., AFE). Each of the signal receiving parts 221 may output signal corresponding to a voltage difference of the first and second input terminals IN1 and IN2.

As described above, in an embodiment, electrodes for detecting touch input, for example, in addition to the sensing electrodes 120 and 130, noise detecting electrodes 160 may be additionally included. The noise detecting electrodes 160 may be insulated from the sensing electrodes 120 and the driving electrodes 130. Therefore, there may be a capacitance formed between the sensing electrodes 120, the driving electrodes 130 and/or the noise detecting electrodes 160.

The noise detecting electrodes 160 may be electrically connected to the second input terminal of each signal receiving part 221. Therefore, reference voltage of the signal receiving parts 221 may change along with the voltage change of the noise detecting electrodes 160. That is, according to the potential (voltage level) of the noise detecting electrodes 160, the reference potential of the signal receiving parts 221 may change.

The potential of the noise detecting electrodes 160 may change depending on the noise from the display panel 300, etc. For example, but not by way of limitation, the potential of the noise detecting electrodes 160 may change in response to a common mode noise from the display panel 300, etc.

Therefore, in an embodiment, there may be more noise detecting electrodes 160 provided to the active area 101, and if a reference potential of the signal receiving parts 221 changes using output signal from the noise detecting electrodes 160, the common mode noise may be offset. A pair of sensing electrode 120 and noise detecting electrode 160 may have ripple that corresponds to each other in response to the common mode noise. In particular, in an embodiment, a pair of sensing electrode 120 and noise detecting electrode 160 may extend in the same direction and may be disposed in substantially same locations in the active area 101, and therefore, they may receive the same noise or noise that has very similar shape and/or size. Each of the noise detecting electrodes 160 may be electrically connected to a different signal receiving part 221 via a different third wire 146. In other words, the second input terminal IN2 of the signal receiving part 221 where the first input terminal IN1 is connected to a predetermined sensing electrode 120 may be electrically connected to the noise detecting electrode 160 forming a pair with the sensing electrode 120 via a predetermined third wire 146.

As such, if the first and second input terminals IN1 and IN2 of the signal receiving part 221 are electrically connected to the corresponding sensing electrode 120 and noise detecting electrode 160, the noise component (ripple) included in the sensing signal Sse1 from the sensing electrode 120 may be offset inside the signal receiving part 221. Accordingly, the signal receiving part 221 may output sensing signal Sse2 from which noise is removed (or reduced).

In an embodiment, the electrode parts 162 of the noise detecting electrodes 160 may be arranged inside (or surrounded by) the sensing electrodes 120, respectively. As a result, enough distance between the driving electrodes 130 for receiving driving signal Sdr and the noise detecting electrodes 160 for receiving noise signal Sno may be secured. Accordingly, by reducing or preventing voltage change of the noise detecting electrodes 160 due to the driving signal Sdr, noise signal Sno may be effectively detected.

In an embodiment, the signal-to-noise ratio (SNR) of the touch sensor may be increased to enhance sensitivity. In an embodiment, a touch sensor of high sensitivity and a display device having the same may be provided.

An embodiment may be effectively applied to a display device having a short distance between the sensor part 100 and the display panel 300, etc. For example, but not by way of limitation, an embodiment may be effectively applied to enhance touch sensitivity in a display device having an on-cell type which is sensitive to noise as the sensing electrodes 120 and the driving electrodes 130 are directly formed on the upper substrate or the thin film encapsulation layer of the display panel 300, etc. However, it is not limited thereto, and it should be understood that an embodiment can be applied to various types of display device or electronic device.

FIG. 5 shows an embodiment relating to the sensor part shown in FIG. 4. FIGS. 6A and 6B show different embodiments of the sensor part shown in FIG. 5. FIG. 7A show a first layer of the sensor part shown in FIG. 5. FIG. 7B shows a second layer of the sensor part shown in FIG. 5. FIG. 8A shows an example of a cross section along line I-I' in FIG. 5. FIG. 8B shows an example of a cross section along line II-II' in FIG. 5. In FIGS. 5 to 8B, same reference numerals are used for similar or same components as found in FIG. 4, and detailed description thereof will be omitted.

Referring to FIGS. 5 to 8B, in an embodiment, first electrode cells 122 and second electrode cells 132 may be arranged on the same layer. For example, but not by way of limitation, the first electrode cells 122 and the second electrode cells 132 may be provided as a first layer L1 on a substrate 110. One of first connecting parts 124 and second connecting parts 134 may be disposed as the first layer L1 along with the first and second electrode cells 122 and 132 on the substrate 110. For example, but not by way of limitation, the second connecting parts 134 may be provided as the first layer L1 and the second electrode cells 132 are connected one another by the second connecting parts 134 which are formed of the same material and formed through a same process as the second electrode cells 132. However, they are not limited thereto. In another embodiment, all of first and second connecting parts 124 and 134 may be disposed on a layer that is different from the first and second electrode cells 122 and 132. In yet another embodiment, first and second electrode cells 122 and 132 may be disposed on different layers. For example, but not by way of limitation, the first electrode cells 122 may be connected to the first connecting parts 124 in one body, the second electrode cells 132 may be connected to the second connecting parts 134 in one body, and the sensing electrodes 120 and the driving electrodes 130 may be disposed on different layers with at least one insulating layer (or a space) interposed therebetween.

In an embodiment, the first connecting parts 124 may be disposed as a second layer L2 that is disposed on the first layer L1 with at least one insulating layer, e.g., a first insulating layer 170 interposed between the first connecting part 124 and the first layer L1. In an embodiment, the second layer L2 may be disposed between the substrate 110 and the first layer L1. In other words, the first connecting parts 124 may be implemented as a lower bridge as shown in FIGS. 8A and 8B. However, they are not limited thereto. For example, but not by way of limitation, in another embodiment, the positions of the first layer L1 and the second layer L2 may be interchangeable. In other words, depending on embodiment, the first layer L1 may be disposed between the substrate 110 and the second layer L2, and the first connecting parts 124 may be implemented as the upper bridge. As such, if the first connecting parts 124 are disposed on different layer from the first electrode cells 122, the first connecting parts 124 may be electrically connected between adjacent first electrode cells 122 via a first contact holes CH1. Meanwhile, in yet another embodiment, the first connecting parts 124 and the noise detecting electrodes 160 may be disposed on different layers. For example, but not by way of limitation, the sensing electrodes 120 and the driving electrodes 130 may be disposed on different layers that are spaced apart, and the noise detecting electrodes 160 may be arranged on a middle layer which is disposed between the sensing electrodes 120 and the driving electrodes 130 with insulating layers disposed above and below the noise detecting electrodes 160.

In an embodiment, inside the first electrode cells 122, e.g., at a central part, an opening OP may be formed, and first dummy patterns 126 may be arranged to be spaced apart from the first electrode cells 122 inside the opening OP. Also, inside the second electrode cells 132, e.g., at a central part, an opening OP may be formed, and second dummy patterns 136 may be arranged to be spaced apart from the second electrode cells 132 inside the opening OP. In an embodiment, the first and second dummy patterns 126 and 136 may be provided as the first layer L1 of the sensor part 100 along with the first and second electrode cells 122 and 132. However, they are not limited thereto. For example, but not by way of limitation, in another embodiment, at least one of the first and second dummy patterns 126 and 136 may be omitted or provided on different layers from the first and second electrode cells 122 and 132.

In an embodiment, electrode parts 162 that are spaced apart from the first electrode cells 122 may be arranged inside the first electrode cells 122. For example, but not by way of limitation, the electrode parts 162 may be provided as the second layer L2. In an embodiment, in order to reduce parasitic capacitance between the sensing electrodes 120 and the driving electrodes 130 and the noise detecting electrodes 160, the electrode parts 162 may be arranged such that they would not overlap the first electrode cells 122. For example, but not by way of limitation, the electrode parts 162 may have a smaller area than the first dummy patterns 126 yet overlap the first dummy patterns 126 as shown in FIG. 5. For example, but not by way of limitation, the electrode parts 162 may be disposed at a central part of the second electrode cells 122 to be surrounded by the second electrode cells 122.

However, they are not limited thereto, and the electrode parts 162 may have various areas, shapes and/or positions. For example, but not by way of limitation, a pair of electrode part 162 and first dummy pattern 126 corresponding to each other may have same area and shape and yet completely overlap each other as shown in FIG. 6A.

In an embodiment, in FIGS. 5 and 6A, the first and second electrode cells 122 and 132, the first and second connecting parts 124 and 134, the first and second dummy patterns 126 and 136 and the electrode parts 162 are shown to be board-shaped or bar-shaped, but they are not limited thereto. For example, but not by way of limitation, at least one of the first and second electrode cells 122 and 132, the first and second connecting parts 124 and 134, the first and second dummy patterns 126 and 136 and the electrode parts 162 may be mesh shaped electrode or implemented with mesh pattern. In other words, in another embodiment, at least one of the sensing electrodes 120, the driving electrodes 130, the noise detecting electrodes 160, the first and second dummy patterns 126 and 136 may be implemented with mesh shape.

For example, but not by way of limitation, as shown in FIG. 6B, the first and second electrode cells 122 and 132, the first and second connecting parts 124 and 134, the first and second dummy patterns 126 and 136, and the electrode parts 162 may be mesh shaped electrode or pattern that includes multiple conductive fine lines connected to one another to form a mesh shape. Also, in FIG. 6B, each of the connection lines 164 is shown as a single line, but depending on embodiment, each connection line 164 may be implemented as mesh shape that includes a plurality of conductive fine lines connected to one another to form a mesh shape (not shown). Also, in FIG. 6B, the conductive fine lines FL are shown to be arranged in a diagonal line direction, but the arrangement direction, shape, etc. of the conductive fine lines FL may vary. Also, in FIG. 6B, for convenience, the contact hole (e.g., the first contact hole CH1 in FIG. 5) is omitted, but if the first electrode cells 122 and the first connecting parts 124 are arranged on different layers the first electrode cells 122 and the first connecting parts 124 that form the sensing electrodes 120 may be physically and/or electrically connected to each other via a contact hole that is not shown.

Meanwhile, in yet another embodiment, only a portion of the first and second electrode cells 122 and 132, the first and second connecting parts 124 and 134, the first and second dummy patterns 126 and 136, the electrode parts 162 and the connection lines 164 may be board-shaped or bar-shaped electrode or pattern, and the remaining may be implemented as mesh-shaped. In other words, the sensing electrodes 120, the driving electrodes 130, the noise detecting electrodes 160, the first and second dummy patterns 126 and 136 may have variable shapes or configurations.

In an embodiment, the electrode parts 162 may be connected in a first direction by the connection lines 164. One area of the connection lines 164 may overlap the first electrode cells 122. In an embodiment, the electrode parts 162 and the connection lines 164 may be provided as the second layer L2 of the sensor part 100 along with the first connecting parts 124. The electrode parts 162 and the connection lines 164 may be formed of a same material and connected in one body.

When the electrode parts 162 and the connection lines 164 are arranged on the same layer as the first connecting parts 124, the connection lines 164 may not overlap the first connecting parts 124. For example, but not by way of limitation, the connection lines 164 may electrically connect the adjacent electrode parts 162 so as not to contact the first connecting part 124. For example, the connection lines 164 detours an area in which the first connecting parts 124 exist. As a result, the sensing electrode 120 and the noise detecting electrode 160 corresponding to each other may maintain insulation from each other.

In an embodiment, an opening OP may be formed in each of the sensing electrodes 120, and the electrode parts 162 of the noise detecting electrodes 160 are arranged such that they are spaced apart from the sensing electrodes 120 in the openings OP. For example, but not by way of limitation, in an embodiment, the opening OP may be formed inside each first electrode cell 122, the first dummy patterns 126 may be provided in the opening OP not to connected to the first electrode cell 122, and at the same time, the electrode parts 162 of the noise detecting electrodes 160 may be provided so as to overlap the first dummy patterns 126. As a result, by reducing parasitic capacitance which may be formed between the noise detecting electrodes 160, the sensing electrodes 120 and/or the driving electrodes 130, malfunction of the touch sensor may be prevented, and the noise signal Sno may be more effectively detected.

FIGS. 9 to 12 show an embodiment relating to the sensor part shown in FIG. 4. Each of FIGS. 9 to 12 shows different modified embodiments with respect to an embodiment shown in FIG. 5. In other words, FIGS. 5, 9 to 12 show various embodiments relating to the sensor part shown in FIG. 4. In FIGS. 9 to 12, same reference numerals are used for similar or same components as in the aforementioned embodiments, and detailed description thereof will be omitted.

Referring to FIG. 9, second and third dummy patterns 136 and 166 overlapping each other are disposed inside the opening OP of each second electrode cell 132. In an embodiment, the second dummy pattern 136 may be a floated island shaped pattern spaced apart from the second electrode cell 132 on the same layer as the second electrode cell 132. The third dummy pattern 166 may be provided on the same layer as the electrode part 162 and the connection lines 164 that form the noise detecting electrode 160. For example, but not by way of limitation, the third dummy pattern 166 may be disposed to overlap the second dummy pattern 136 with at least one insulating layer (e.g., the first insulating layer 170 shown in FIGS. 8A and 8B) interposed between the third dummy pattern 166 and the second dummy pattern 136 and may be arranged on the lower part of the second dummy pattern 136 so as to be spaced apart from the second dummy pattern 136. In an embodiment, the third dummy pattern 166 may be formed of the same material as the electrode parts 162, but it is not limited thereto.

In an embodiment, the second dummy pattern 136 may have substantially the same or similar shape and size as the first dummy pattern 126, and the third dummy pattern 166 may have substantially the same or similar shape or size as the electrode part 162. According to the embodiment shown in FIG. 9, patterns including the sensing electrode 120, the driving electrode 130, the dummy patterns 126, 136 and 166 and the electrode parts 162 in the active area 101 may have uniform configuration throughout the active area 101, thus more uniform viewing (or visual) characteristics may be secured throughout the active area 101.

Referring to FIG. 10, the electrode parts 162 and the third dummy patterns 166 of the second layer L2 described in the above-mentioned embodiments may be omitted. In the embodiment in FIG. 10, the first dummy patterns 126 provided as the first layer L1 along with the first and second electrode cells 122 and 132 may be connected in the first direction via the connection lines 164 provided as the second layer L2. In other words, in the embodiment, the noise detecting electrode 160 may be formed with the first dummy patterns 126 and the connection lines 164. As such, depending on the embodiment, the first dummy patterns 126 may be utilized as the electrode part of the noise detecting electrode 160. The electrode parts (i.e., the first dummy patterns 126) may be spaced apart from the first electrode cells 122 and formed as the first layer L1 of the sensor part 100. The connection lines 164 may be disposed as the first layer L1 to overlap the first electrode cells 122 with at least one insulating layer, e.g., the first insulating layer 170, interposed between the connection lines 164 and the first electrode cells 122. The connection lines 164 may be provided as the second layer L2 separated from the first layer L1, and may be electrically connected to the electrode parts via a contact hole (not shown) formed through the first insulating layer 170.

Referring to FIG. 11, a pair of first dummy pattern 126 and electrode part 162 overlapping each other may be electrically connected to each other via at least one second contact hole CH2. For example, but not by way of limitation, the first dummy pattern 126 and the electrode part 162 overlapping each other may be electrically connected via a plurality of second contact holes CH2 formed through the first insulating layer 170 interposed therebetween. Accordingly, the noise detecting electrode 160 may be a multi-layer structure. In other words, in the embodiment, the first dummy patterns 126 may form each noise detecting electrode 160 along with the electrode parts 162 and the connection lines 164.

Referring to FIG. 12, each of the first and second electrode cells 122 and 132 may not include an opening OP described in the aforementioned embodiments. In the embodiment in FIG. 12, the first, second and third dummy patterns 126, 136 and 166 that are described in the aforementioned embodiments may be omitted. The electrode parts 162 may be arranged inside the first electrode cells 122 so as to overlap each one area of the first electrode cells 122, particularly the central part. The electrode parts 162 may be disposed to overlap the first electrode cells 122 with at least a first insulating layer 170 interposed therebetween and may be spaced apart from the first electrode cells 122. Accordingly, the sensing electrodes 120 and the noise detecting electrodes 160 may maintain insulation from each other.

In the aforementioned embodiments, the sensor part 100 may include noise detecting electrodes 160 distributed in the active area 101 in order to detect noise signal. In an embodiment, the structure, shape, etc. of the noise detecting electrodes 160 may change.

FIGS. 13 and 14 show a touch sensor according to an embodiment. For convenience, FIG. 13 schematically shows the configuration of the sensing circuit with respect to a plurality of Rx channels, and FIG. 14 shows the configuration of the sensing circuit with respect to the Rx channel around one Rx channel in more detail. In other words, the sensing circuit with respect to the Rx channels shown in FIGS. 13 and 14 may have substantially the same or similar structure. FIG. 15 shows another embodiment of an analog-to-digital converter shown in FIGS. 13 and 14. FIG. 16 shows another embodiment of a peak hold circuit shown in FIGS. 13 and 14. In FIGS. 13 to 16, same reference numerals are used for similar or same components as FIG. 4, and detailed description thereof will be omitted.

Referring to FIGS. 13 and 14, as for the touch sensor in an embodiment, a plurality of noise detecting electrodes 160 may share one third wire 146. In other words, in the embodiment, the plurality of noise detecting electrodes 160 may be connected to one third wire 146 in common and detect at once a noise signal Sno applied throughout the sensor part 100. In an embodiment, the number of wires arranged inside the sensor part 100 may be reduced. Therefore, the noise reduction structure in the embodiment may be useful for the narrow bezel type touch sensor as well.

Also, in an embodiment, the touch sensor may further include an amplifier circuit part 222 connected between the noise detecting electrodes 160 and the signal receiving parts 221 and a peak hold circuit 224 (PHC) (or a peak hold amplifier (PHA)) connected between the signal receiving parts 221 and the analog-to-digital converter parts 223. In an embodiment, the touch sensor may further include fifth switches SW51 to SW54 for selectively connecting each signal receiving part 221 and the peak hold circuit 224. In an embodiment, the touch sensor may further include sixth switches SW61 to SW64 and seventh switches SW71 to SW74 for selectively connecting each analog-to-digital converter part 223 to the output terminal OUT of the corresponding signal receiving part 221 or the output terminal of the peak hold circuit 224.

In an embodiment, each signal receiving part 221 may include a first input terminal IN1 connected to the corresponding sensing electrode 120 and a second input terminal IN2 connected to the noise detecting electrodes 160 via the amplifier circuit part 222. Each signal receiving part 221 may include a first amplifier AMP1 having first and second input terminals IN1 and IN2, a first switch SW1 and a second switch SW2 connected in parallel between the output terminal OUT of the first amplifier AMP1 and the first input terminal IN1, a first capacitor C1 and a reset switch SWr connected in parallel between the output terminal OUT of the first amplifier AMP1 and the first switch SW1, and a second capacitor C2 and a first resistor R1 connected in parallel between the output terminal OUT of the first amplifier AMP1 and the second switch SW2. Each of the signal receiving parts 221 may output a voltage that corresponds to the voltage difference between the first input terminal IN1 and the second input terminal IN2.

In an embodiment, the first switch SW1 and the second switch SW2 may be turned on in different periods. For example, but not by way of limitation, the first switch SW1 may be turned on in response to a first mode during a period when the first mode is performed, and the second switch SW2 may be turned on in response to a second mode during a period when the second mode is performed. In an embodiment, the first mode may be a sensor driving mode (or normal mode) for detecting touch input, and the second mode may be a gain calibration mode to calibrate amplification gain of the noise signal Sno per Rx channel in order to maximize the noise offset effect.

In an embodiment, the amplifier circuit part 222 may be connected between the noise detecting electrodes 160 and each second input terminal IN2 of the signal receiving parts 221. The amplifier circuit part 222 may receive the noise signal Sno from the noise detecting electrodes 160, amplify it to correspond to a predetermined gain value and output it to each signal receiving part 221.

For this, the amplifier circuit part 222 may include a second amplifier AMP2. In an embodiment, the second amplifier AMP2 may include a fifth input terminal (or a fifth terminal) IN5 connected to the noise detecting electrodes 160 via the third wire 146 and a sixth input terminal (or a sixth terminal) IN6 connected to a bias power source Vbias. In an embodiment, the fifth input terminal IN5 and the sixth input terminal IN6 may be a non-inverting input terminal and an inverting input terminal, respectively, but they are not limited thereto. In an embodiment, a second resistor R2 and a fourth capacitor C4 for stabilizing input may be connected in the fifth input terminal IN5. In an embodiment, the second resistor R2 and the fourth capacitor C4 may be connected in parallel between the fifth input terminal IN5 and the bias power source Vbias. In an embodiment, at least one first buffer BU1 may be connected between the amplifier circuit part 222 and the bias power source Vbias. In an embodiment, Ra and Rb in FIGS. 13 and 14 refer to input/output impedance of the second amplifier AMP2.

The amplifier circuit part 222 may include a plurality of variable resistors VR1 to VR4 connected in parallel between the output terminal of the second amplifier AMP2 and the bias power source Vbias. In an embodiment, each variable resistor (one of VR1 to VR4) may be connected to the second input terminal IN2 of the signal receiving part 221 provided to each Rx channel via different output terminal (one of OUT1 to OUT4) of the amplifier circuit part 222. In an embodiment, the resistance value of the variable resistors VR1 to VR4 may change corresponding to the gain control signal GCS input from the processor 225 via the seventh input terminal (or a seventh terminal) IN7. In the embodiment described above, a plurality of noise detecting electrodes 160 may be connected to the fifth input terminal IN5 of the amplifier circuit part 222 in common, but the second input terminal IN2 included in signal receiving part 222 of each sensing electrodes 120 may be connected to different variable resistors (one of VR1 to VR4) included in the amplifier circuit part 222. The plurality of noise detecting electrodes 160 may be connected to one third wire 146 to reduce the number of wires arranged in the sensor part 100, and the gain value of the noise signal Sno may be independently adjusted per Rx channel. Therefore, noise may be effectively offset per Rx channel.

In an embodiment, at least a third switch SW31 and SW32 may be provided between the second input terminal IN2 of each signal receiving part 221 and the corresponding variable resistor (any one of VR1 to VR4) and/or between the second input terminal IN2 and the bias power source Vbias. However, in another embodiment, the third switch SW31 and SW32 may be omitted.

In an embodiment, each analog-to-digital converter part 223 may include a third input terminal (or a third terminal) IN3 connected to the output terminal OUT of the signal receiving part 221 of the corresponding Rx channel and a fourth input terminal (or a fourth terminal) IN4 connected to the second input terminal IN2 of the signal receiving part 221. In an embodiment, at least one buffer BU21 to BU24 may be connected between the second input terminal IN2 and the fourth input terminal IN4 corresponding to each other.

In an embodiment, each analog-to-digital converter part 223 may be formed of a differential analog-to-digital converter outputting a digital signal corresponding to a voltage difference of the third and fourth input terminals IN3 and IN4 by operating in a differential mode. However, it is not limited thereto. For example, but not by way of limitation, in another embodiment as shown in FIG. 15, the analog-to-digital converter part 223' may include a singled ended analog-to-digital converter 2231. The analog-to-digital converter part 223' may include a fourth amplifier AMP4 having third and fourth input terminals IN3 and IN4 (e.g., a differential amplifier) and a singled ended analog-to-digital converter 2231 connected to the output terminal of the fourth amplifier AMP4. In FIG. 15, Rc to Rf show input/output impedance of the fourth amplifier AMP4.

In an embodiment, the third input terminal IN3 of each analog-to-digital converter part 223 or 223' may be connected to a peak hold circuit 224 via a sixth switch (one of SW61 to SW64). When the third input terminal IN3 is connected to the peak hold circuit 224, the third input terminal IN3 may be connected to the output terminal OUT of the corresponding signal receiving part 221 via the peak hold circuit 224. Or the third input terminal IN3 of each analog-to-digital converter part 223 or 223' may be directly connected to the output terminal OUT of the corresponding signal receiving part 221 via a seventh switch (one of SW71 to SW74). The analog-to-digital converter part 223 or 223' may output digital signal corresponding to a voltage difference of the third and fourth input terminals IN3 and IN4. For example, but not by way of limitation, the analog-to-digital converter part 223 or 223' may output digital signal having n bits (where n is a natural number) in response to the voltage difference of the third and fourth input terminals IN3 and IN4.

In an embodiment, the peak hold circuit 224 may be connected between the output terminal OUT of each signal receiving part 221 and the third input terminal IN3 of the corresponding analog-to-digital converter part 223 or 223'. In an embodiment, a plurality of signal receiving parts 221 and/or the analog-to-digital converter parts 223 or 223' may share one peak hold circuit 224. For this, there may be fifth switches SW51 to SW54 for channel selection between the peak hold circuit 224 and the signal receiving parts 221, and sixth switches SW61 to SW64 for channel selection between the peak hold circuit 224 and the analog-to-digital converter parts 223 or 223'.

In an embodiment, the peak hold circuit 224 may include a third amplifier AMP3, a first diode D1, a third capacitor C3 and a fourth switch SW4. In an embodiment, the peak hold circuit 224 may further include at least one of the second diode D2, the third resistor R3 and the third buffer BU3.

In an embodiment, the third amplifier AMP3 may include a seventh input terminal IN7 and an eighth input terminal (or an eighth terminal) IN8. IN an embodiment, the seventh input terminal IN7 may be connected to the output terminal OUT of each signal receiving part 221 via the fifth switch (one of SW51 to SW54). In an embodiment, the eighth input terminal IN8 may be connected to the output terminal of the peak hold circuit 224 (e.g., the output terminal of the third buffer BU3) via the third resistor R3. In an embodiment, the third buffer BU3 may be connected between the output terminal of the third amplifier AMP3 and the third input terminal IN3 of the analog-to-digital converter parts 223 or 223'.

In an embodiment, the first diode D1 may be connected between the output terminal of the third amplifier AMP3 and the third buffer BU3. In an embodiment, the second diode D2 may be connected between the output terminal of the third amplifier AMP3 and the eighth input terminal IN8. In an embodiment, the first and second diodes D1 and D2 may be connected in the same direction. For example, but not by way of limitation, the first and second diodes D1 and D2 may be connected in a forward direction as shown in FIG. 14. However, the connection direction of the first and second diodes D1 and D2 may change. For example, but not by way of limitation, the first and second diodes D1 and D2 of the peak hold circuit 224' may be connected in a reverse direction.

For example, but not by way of limitation, the peak hold circuit 224 may be formed of a positive type peak hold circuit as shown in FIG. 14 or a negative type peak hold circuit as shown in FIG. 16. Since the peak hold circuit 224' in FIG. 16 may be the same as the peak hold circuit 224 in FIG. 14 except for the first and second diodes D1 and D2 being connected in a reverse direction, the detailed description thereof will be omitted.

In an embodiment, the third capacitor C3 and the fourth switch SW4 may be connected in parallel between a connection node N1 between the first diode D1 and the third buffer BU3 and the second input terminal IN2. In an embodiment, the third capacitor C3 and the fourth switch SW4 may be connected to the second input terminal IN2 via the second buffer BU2. Also, in an embodiment, if a plurality of signal receiving parts 221 share one peak hold circuit 224 and 224', the third capacitor C3 and the fourth switch SW4 may be connected to the second input terminal IN2 of the signal receiving part 221 provided to the corresponding Rx channel during a period of calibrating the noise gain value with respect to each Rx channel. For this, a plurality of switches that are not shown may be connected between the second input terminal IN2 of each signal receiving part 221 and the peak hold circuit 224 and 224'.

Meanwhile, the configuration of the peak hold circuit 224 and 224' is not limited to the embodiment shown in FIGS. 14 and 16. For example, but not by way of limitation, the peak hold circuit 224 and 224' may be implemented with the currently published, various types of peak hold circuits (or peak hold amps).

In an embodiment, the touch sensor may be operated in a first mode and a second mode. The processor 225 may operate differently in response to the first mode and the second mode. For example, but not by way of limitation, during when the first mode is performed, in response to the digital signal input from each analog-to-digital converter part 223 or 223', the touch input occurring in the sensor part 100 may be detected. Also, while the second mode is being performed, the processor 225 may output a gain control signal GCS for calibrating the gain value of the amplifier circuit part 222 in response to the digital signal input from each analog-to-digital converter part 223 or 223'. For example, but not by way of limitation, the processor 225 may output a gain control signal GCS which calibrates the gain value of each variable resistor VR1 to VR4 to offset the noise as much as possible in each signal receiving part 221 with respect to each Rx channel.

In other words, the gain control signal GCS may be a control signal for calibrating the gain value of the amplifier circuit part 222 so as to make the magnitude of the noise included in the input signal received via two input terminals (first and second input terminals IN1 and IN2) of the signal receiving part 221 substantially the same or similar within a predetermined error range. That is, while the second mode is being performed, by optimizing the gain value of the amplifier circuit part 222, the noise signal Sno flown into the first and second input terminals IN1 and IN2 of the signal receiving part 221 during the period when the first mode is being performed may be effectively offset. Consequently, SNR of the touch sensor may be increased, and sensitivity may be enhanced.

In an embodiment, when the touch sensor is driven in a first mode, by inputting a noise signal Sno into a reference terminal of each signal receiving part 221, e.g., the second input terminal IN2, the noise may be offset. In an embodiment, by independently calibrating the gain of the noise signal Sno per Rx channel, the noise may be more effectively offset.

Noise signals Sno having different magnitudes (or levels) may be flown into the sensing electrodes 120 depending on the locations of the sensing electrodes 120. Therefore, in an embodiment, the gain value of the noise signal Sno input into each signal receiving part 221 may be independently calibrated depending on the magnitude of the noise signal Sno that is flown into each Rx channel. For example, but not by way of limitation, while the second mode is being performed, each resistance value of the variable resistors (VR1 to VR4) may be calibrated in order for noise to be offset as much as possible per Rx channel using the gain control signal GCS. In other words, while the second mode is performed, the resistance values of the variable resistors (VR1 to VR4) may be automatically calibrated (or adjusted) so that the noise signal Sno may be offset (or canceled) as much as possible in each signal receiving part 221 during the first mode to be succeeded. Consequently, while the first mode is performed which detects actual touch input, noise components included in the sensing signal Sse1 input to each Rx channel may be more accurately matched and offset.

Accordingly, in an embodiment, by effectively offsetting common mode noise flown into the sensor part 100 of the touch sensor, the SNR of the touch sensor may be increased. Consequently, malfunction of the touch sensor according to the noise signal Sno may be minimized, and the sensitivity may be enhanced.

FIG. 17 shows operation of a touch sensor in a first mode according to an embodiment. FIG. 18 shows operation of a touch sensor in a first mode in another embodiment. FIG. 18 shows the analog-to-digital converter being formed as shown in FIG. 15, and the remaining operation processes are substantially the same as the embodiment in FIG. 17.

FIGS. 17 and 18 are simple drawings of the differential circuit when the touch sensor is operating in the first mode in the embodiment in FIGS. 13 to 16, and thus the drawings of the buffer, etc. are omitted. For convenience, operations of the first mode of the touch sensor based on one Rx channel (e.g., the last Rx channel) as shown in FIGS. 14 and 15 will be described.

Referring to FIGS. 17 and 18, in an embodiment, when the touch sensor is operating in the first mode, the first switch SW1, the third switch SW31 connected between the second input terminal IN2 of the corresponding Rx channel and the variable resistor VR4, and a seventh switch SW74 connected between the signal receiving part 221 of the corresponding Rx channel and the analog-to-digital converter part 223 or 223', among the switches shown in FIGS. 14 and 15, may be turned on. In an embodiment, the remaining switches may be turned off. Consequently, a differential circuit as shown in FIGS. 17 and 18 may be formed.

In an embodiment, the first mode may be performed during a regular mode period (e.g., the time a user actually uses the touch sensor or the display device) when the touch sensor is activated. During the period when the first mode is performed, the driving circuit 210 may sequentially supply driving signal Sdr to the driving electrodes 130. Accordingly, the sensing signal Sse1 corresponding to the driving signal Sdr from the corresponding sensing electrode 120 may be input into the first input terminal IN1 of the signal receiving part 221, and the noise signal Sno from the noise detecting electrodes 160 may be input into the second input terminal IN2 via the amplifier circuit part 222. The amplifier circuit part 222 may amplify the noise signal so as to correspond to the magnitude of the noise component included in the sensing signal Sse1 and output it. The signal receiving part 221 may output signal corresponding to voltage difference between the first and second input terminals IN1 and IN2. The signal receiving part 221 may output a signal corresponding to a voltage difference of the first and second input terminals IN1 and IN2. Meanwhile, the reset switch SWr may be turned on about the time when the integrator (for example, but not by way of limitation, the integrator formed of the first amplifier AMP1 and the first capacitor C1), formed inside of the signal receiving part 221 and equivalently formed, is reset.

The analog-to-digital converter part 223 or 223' may output a digital signal corresponding to the voltage difference of the output node OUT of the signal receiving part 221 and the second input terminal IN2 based on the potential of the second input terminal IN2. The processor 225 may receive a digital signal from the analog-to-digital converter part 223 or 223' and detect touch input in response to the digital signal.

In an embodiment, when the touch sensor operates in the first mode, touch input may be detected in response to the voltage difference between the sensing signal Sse1 input to the first input terminal IN1 and the input the noise signal Sno (a noise signal that is amplified according to a predetermined gain value) input to the second input terminal IN2. In other words, the sensing circuit 220 may detect the sensing signal Sse1 by having the potential of the noise signal Sno input to the second input terminal IN2 as the reference potential, and detect touch input in response. In an embodiment, by effectively offsetting the noise signal Sno flown into the sensor part 100, the sensitivity of the touch sensor may be enhanced.

FIG. 19 shows operation of a touch sensor in a second mode according to an embodiment. FIG. 20 shows operation of a touch sensor in a second mode in another embodiment. FIG. 20 shows the analog-to-digital converter being configured as in the embodiment shown in FIG. 15, and the rest of the operation process are substantially the same as the embodiment in FIG. 19. Meanwhile, FIGS. 19 and 20 show the embodiment where the peak detection circuit detects the forward-direction peak value of the signal output from the signal receiving part, but it is not limited thereto. For example, but not by way of limitation, if the peak detection circuit is configured as shown in FIG. 16, the peak detection circuit may detect the reverse direction peak value of the signal output from the signal receiving part.

FIGS. 19 and 20 show the differential circuit in a simplified manner when the touch sensor operates in a second mode according to the embodiments in FIGS. 13 to 16, and buffer, etc. are omitted. For convenience, based on one Rx channel (e.g., the last Rx channel) shown in FIGS. 14 and 15, the operation of the second mode of the touch sensor is described.

Referring to FIGS. 19 and 20, in an embodiment, when the touch sensor operates in a second mode, the second switch SW2, and the third switch SW31 connected between the second input terminal IN2 of the corresponding Rx channel and the variable resistor VR4, the fifth switch SW54 connected between the peak hold circuit 224 and 224' and the signal receiving part 221 of the corresponding Rx channel and the sixth switch SW64 connected between the peak hold circuit 224 and 224' and the corresponding analog-to-digital converter part 223 or 223' may be turned on. The rest of the switches may be turned off. As such, the differential circuit such as the one shown in FIGS. 19 and 20 may be formed.

In an embodiment, the second mode may be, per Rx channel, a gain calibration mode for calibrating the amplification gain of the noise signal Sno2 to be input to the second input terminal IN2. In an embodiment, the second mode may be performed at least once in a module process prior to shipment of the product (the touch sensor and/or the display device including the touch sensor according to the embodiment). In an embodiment, the second mode may be performed at a predetermined time (e.g., at the power-on time of the touch sensor) and/or during a predetermined period even after the product has been shipped.

In an embodiment, during the period when the second mode is performed, the driving circuit 210 may not supply a driving signal Sdr to the driving electrodes 130. Meanwhile, during the period when the second mode is performed, the display driver (400 in FIG. 1) may drive the display panel 300 for the display panel (300 in FIG. 1) to display a predetermined image. Accordingly, while the second mode is performed, a common mode noise (display noise) may be flown into the sensor part 100 from the display panel 300, etc.

While the second mode is performed, the first and second noise signals Sno1 and Snot may be input from the sensing electrode 120 and the noise detecting electrode 160 to the first and second input terminals IN1 and IN2, respectively, of the signal receiving part 221. An amplified noise signal Sno2 may be input according to the gain value of the amplifier circuit part 222 to the second input terminal IN2. As such, while the second mode is performed, the signal receiving part 221 may operate as a trans-impedance amplifier. When the first and second noise signals Sno1 and Sno2 that have the same magnitude are input to the first and second input terminals IN1 and IN2, respectively, common mode noise may be offset.

While the second mode is performed, the peak hold circuit 224 may detect a positive peak value (or, a negative peak value, or the sum of the positive peak value and the negative peak value) of the signal output to the output terminal OUT of the signal receiving part 221 and output it to the third input terminal IN3 of the analog-to-digital converter part 223 or 223'. That is, the peak hold circuit 224 may detect the magnitude of the signal output from the output terminal OUT of the signal receiving part 221 (the magnitude of the noise corresponding to the voltage difference of the first and second noise signals Sno1 and Sno2).

The analog-to-digital converter part 223 or 223' may output a digital signal corresponding to the magnitude of the noise input from the peak hold circuit 224 based on the potential of the second input terminal IN2. The processor 225 may generate a gain control signal GCS for calibrating the gain value of the second noise signal Sno2 such that the magnitude of the noise may reduce in response to the digital signal input from the analog-to-digital converter part 223 or 223' and may output it to the amplifier circuit part 222. As such, the processor 225 may calibrate the resistance value of the variable resistor (e.g., VR4) connected between the second input terminal IN2 of the corresponding Rx channel and the noise detecting electrode 160 using the gain control signal GCS. For example, but not by way of limitation, the processor 225 may calibrate the amplifying gain of the second noise signal Sno2 by calibrating the resistance value of the variable resistor (e.g., VR4) using the gain control signal GCS until the voltage difference of the first and second noise signals Sno1 and Sno2 (e.g., the magnitude of the peak value detected from the peak hold circuit 224) input to the first and second input terminals IN1 and IN2 becomes substantively "0" or is minimized to "0". Accordingly, the resistance value of the variable resistor (VR1 to VR4) of the amplifier circuit part 222 with respect to each Rx channel may be set to offset the noise as much as possible.

In the aforementioned embodiment, while the second mode is performed, a gain control signal GCS may occur in order to reduce or minimize the voltage difference of the first and second noise signals Sno1 and Sno2 in response to the voltage difference of the first and second noise signals Sno1 and Sno2 input to the first and second input terminals IN1 and IN2, respectively. The resistance value of the variable resistor (VR1 to VR4) (the gain value of the amplifier circuit part 222 with respect to each Rx channel) may be calibrated using the gain control signal GCS. Consequently, the noise signal Sno flown into the sensor part 100 may be more accurately offset during the ensuing first mode period.

FIG. 21 shows a touch sensor and operation of the touch sensor in a second mode according to yet another embodiment. With reference to FIG. 21, detailed description of the similar or same components as found in the aforementioned embodiments will be omitted.

Referring to FIG. 21, the peak hold circuit 224 and 224' disclosed in the aforementioned embodiments may be omitted. The analog-to-digital converter part 223 or 223' may generate a digital signal corresponding to the instant magnitude of the analog signal output from the signal receiving part 221 by sampling at high speed the analog signal which is output from the signal receiving part 221. The processor 225 may detect the peak value (magnitude) of the analog signal output from the signal receiving part 221 in response to the digital signal. The processor 225 may generate a gain control signal GCS based on the peak value of the detected analog signal, and calibrate the gain value of the amplifier circuit part 222 using the gain control signal GCS.

By way of summary, common mode noise that is introduced into the sensor part of the touch sensor may be effectively offset. Accordingly, the touch sensor's malfunctioning as a result of noise signal may be minimized, and the sensing sensitivity of the touch sensor may be improved.

While the spirit and scope of the inventive concept describe in detail exemplary embodiments of the inventive concept, it should be noted that the above-described embodiments are merely descriptive and should not be considered as limiting. Further, it should be understood by those skilled in the art that various changes, substitutions, and alterations may be made herein without departing from the scope of the inventive concept as defined by the following claims.

What is claimed is:

1. A sensor-display panel, comprising:
   a display panel comprising pixels and an encapsulation layer;
   a first electrode formed in a mesh pattern, the first electrode comprising first electrode cells arranged along a first direction and at least one first conductive pattern provided between the first electrode cells, each of the first electrode cells having an opening;
   a second electrode spaced apart from the first electrode, the second electrode comprising electrode parts each disposed in the opening of one of the first electrode cells in a plan view of the sensor-display panel, and at least one second conductive pattern provided between the electrode parts;
   a third electrode spaced apart from the first and second electrodes and formed in a mesh pattern, the third electrode comprising second electrode cells arranged along a second direction and at least one third conductive pattern provided between the second electrode cells; and
   a driving unit connected to the first, second and third electrodes through different terminals and operating in a first mode or a second mode, the driving unit configured to supply a driving signal to the third electrode and to receive sensing signals from the first and second electrodes when operating in the first mode,
   wherein the first, second and third electrodes are formed on the encapsulation layer, and
   wherein the second conductive pattern and at least one of the first and third conductive patterns are on a layer different from the first and second electrode cells.

2. The sensor-display panel of claim 1, wherein the second electrode is formed in a mesh pattern.

3. The sensor-display panel of claim 1, wherein the second conductive pattern connects the electrode parts to each other along the first direction and is spaced from the first conductive pattern in the plan view of the sensor-display panel.

4. The sensor-display panel of claim 3, wherein:
   the first electrode cells are on a first layer on the encapsulation layer, and
   the second conductive pattern and at least one of the first and third conductive patterns are on a second layer between the encapsulation layer and the first layer.

5. The sensor-display panel of claim 1, wherein the driving unit is configured to detect an input corresponding to a voltage difference between the sensing signals output from the first and second electrodes when operating in the first mode.

6. The sensor-display panel of claim 1, wherein the driving unit is configured to adjust a gain value for amplifying a noise signal from the second electrode, using values of the sensing signals from the first and second electrodes, when operating in the second mode.

7. The sensor-display panel of claim 6, wherein the driving unit is configured to adjust the gain value so that a voltage difference between the sensing signals output from the first and second electrodes is reduced when operating in the second mode.

8. The sensor-display panel of claim 6, wherein the driving unit comprises:
   a sensing circuit connected to the first and second electrodes; and
   a driving circuit connected to the third electrode.

9. The sensor-display panel of claim 8, wherein the sensing circuit comprises:
   a signal receiver comprising a first terminal connected to the first electrode and a second terminal connected to the second electrode;
   an amplifier circuit connected between the second terminal and the second electrode, the amplifier circuit configured to amplify the noise signal received from the second electrode in accordance to the gain value;
   an analog-to-digital converter comprising a third terminal connected to an output terminal of the signal receiver and a fourth terminal connected to the second terminal, the analog-to-digital converter configured to output a digital signal corresponding to a voltage difference between the third and fourth terminals; and
   a processor configured to detect an input in response to the digital signal during the first mode, and to output a gain control signal for calibrating the gain value during the second mode.

10. The sensor-display panel of claim 9, wherein the signal receiver comprises:
    a first amplifier including the first and second terminals;
    a first switch turned on during the first mode and a second switch turned on during the second mode, the first and second switches being connected in parallel between the first terminal and an output terminal of the first amplifier;
    a first capacitor and a reset switch connected in parallel between the first switch and the output terminal of the first amplifier; and
    a second capacitor and a first resistor connected in parallel between the second switch and the output terminal of the first amplifier.

11. The sensor-display panel of claim 9, wherein the amplifier circuit comprises:
    a second amplifier including a fifth terminal connected to the second electrode and a sixth terminal connected to a bias power source; and
    a variable resistor connected between an output terminal of the second amplifier and the bias power source and having a resistance value changing in response to the gain control signal.

12. The sensor-display panel of claim 11, wherein the second terminal is connected to the variable resistor.

13. The sensor-display panel of claim 9, wherein the sensing circuit further comprises a peak hold circuit connected between the output terminal of the signal receiver and the third terminal.

14. The sensor-display panel of claim 13, further comprising:
at least one switch connected between the peak hold circuit and the third terminal; and
at least one switch connected between the output terminal of the signal receiver and the peak hold circuit.

15. The sensor-display panel of claim 1, wherein the driving unit is configured to stop supplying the driving signal to the third electrode during the second mode.

16. The sensor-display panel of claim 1, comprising:
a plurality of first electrodes including the first electrode, the plurality of first electrodes sequentially arranged in the second direction and respectively extending in the first direction; and
a plurality of second electrodes including the second electrode, the plurality of second electrodes sequentially arranged in the second direction and respectively extending in the first direction.

17. The sensor-display panel of claim 16, wherein:
the driving unit comprises a plurality of signal receivers; and
each of the plurality of first electrodes is connected to a different one of the plurality of signal receivers.

18. The sensor-display panel of claim 17, further comprising a wire commonly connected between the plurality of second electrodes and the driving unit.

19. The sensor-display panel of claim 16, further comprising:
a plurality of third electrodes including the third electrode, the plurality of third electrodes sequentially arranged in the first direction and respectively extending in the second direction.

20. The sensor-display panel of claim 1, wherein the first and third electrodes constitute a sensor part of a capacitive touch sensor.

21. The sensor-display panel of claim 1, wherein:
the first conductive pattern connects the first electrode cells to each other along the first direction; and
the third conductive pattern connects the second electrode cells to each other along the second direction.

22. The sensor-display panel of claim 1, wherein:
the first conductive pattern extends in the first direction;
the second conductive pattern extends in the first direction; and
the third conductive pattern extends in the second direction.

* * * * *